(12) United States Patent
Liu et al.

(10) Patent No.: US 11,307,943 B2
(45) Date of Patent: Apr. 19, 2022

(54) DISASTER RECOVERY DEPLOYMENT METHOD, APPARATUS, AND SYSTEM

(71) Applicant: Huawei Technologies Co., Ltd., Shenzhen (CN)

(72) Inventors: Huiyong Liu, Shanghai (CN); Mingsen Tao, Shanghai (CN); Jidong Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 223 days.

(21) Appl. No.: 16/577,874

(22) Filed: Sep. 20, 2019

(65) Prior Publication Data
US 2020/0019479 A1     Jan. 16, 2020

Related U.S. Application Data

(63) Continuation of application No. PCT/CN2018/079516, filed on Mar. 20, 2018.

(30) Foreign Application Priority Data

Mar. 21, 2017    (CN) .......................... 201710170186.9

(51) Int. Cl.
     *G06F 11/20*          (2006.01)
     *G06F 9/455*          (2018.01)
     (Continued)

(52) U.S. Cl.
CPC ...... *G06F 11/2023* (2013.01); *G06F 9/45558* (2013.01); *G06F 11/1451* (2013.01);
(Continued)

(58) Field of Classification Search
CPC ............. G06F 11/1469; G06F 11/1451; G06F 11/2023; G06F 2201/82; H04L 41/0663; H04L 41/0886; H04L 41/0893
See application file for complete search history.

(56) References Cited

U.S. PATENT DOCUMENTS

| | | | |
|---|---|---|---|
| 2005/0193245 A1* | 9/2005 | Hayden | G06F 11/2069 714/13 |
| 2010/0094999 A1* | 4/2010 | Rama | G06F 9/5011 709/225 |
| 2010/0293112 A1* | 11/2010 | Prahlad | G06F 3/0685 705/418 |
| 2012/0124100 A1 | 5/2012 | Schabenberger et al. | |

(Continued)

FOREIGN PATENT DOCUMENTS

| | | |
|---|---|---|
| CN | 101222490 A | 7/2008 |
| CN | 102511041 A | 6/2012 |

(Continued)

*Primary Examiner* — Jigar P Patel
(74) *Attorney, Agent, or Firm* — Leydig, Voit & Mayer, Ltd.

(57) ABSTRACT

This application discloses a disaster recovery deployment method, apparatus, and system, and relates to the field of network application technologies. The method includes: obtaining, by a master data center and a backup data center, disaster recovery control information; sending, by the master data center, the data corresponding to the service of the master data center to the at least one backup data center based on the disaster recovery control information; and deploying, by the backup data center, a disaster recovery resource for the master data center based on the disaster recovery control information, and backing up the received data. In other words, the master data center and the backup data center automatically back up resources and data based on the disaster recovery control information, and therefore, manual operation steps in a disaster recovery deployment process are simplified, and efficiency of disaster recovery deployment is improved.

14 Claims, 19 Drawing Sheets

(51) Int. Cl.
*G06F 11/14* (2006.01)
*H04L 12/24* (2006.01)
*H04L 29/08* (2006.01)
*H04L 41/0663* (2022.01)
*H04L 41/08* (2022.01)
*H04L 41/0893* (2022.01)
*H04L 41/0896* (2022.01)
*H04L 67/1095* (2022.01)

(52) U.S. Cl.
CPC ...... *G06F 11/1469* (2013.01); *H04L 41/0663* (2013.01); *H04L 41/0886* (2013.01); *H04L 41/0893* (2013.01); *G06F 2009/45595* (2013.01); *G06F 2201/82* (2013.01); *H04L 41/0896* (2013.01); *H04L 67/1095* (2013.01)

(56) References Cited

U.S. PATENT DOCUMENTS

| | | | |
|---|---|---|---|
| 2013/0017852 A1 | 1/2013 | Liu et al. | |
| 2013/0124597 A1 | 5/2013 | Diao et al. | |
| 2015/0134723 A1 | 5/2015 | Kansal et al. | |
| 2015/0254150 A1* | 9/2015 | Gordon | G06F 11/1469 |
| | | | 714/6.3 |
| 2015/0309896 A1 | 10/2015 | Wu et al. | |
| 2016/0162371 A1* | 6/2016 | Prabhu | G06F 16/176 |
| | | | 707/654 |
| 2017/0031623 A1 | 2/2017 | Gong et al. | |
| 2017/0060975 A1 | 3/2017 | Akyureklier et al. | |

FOREIGN PATENT DOCUMENTS

| | | |
|---|---|---|
| CN | 102742251 A | 10/2012 |
| CN | 103064820 A | 4/2013 |
| CN | 103201740 A | 7/2013 |
| CN | 103647849 A | 3/2014 |
| CN | 103793416 A | 5/2014 |
| CN | 103843284 A | 6/2014 |
| CN | 104104736 A | 10/2014 |
| CN | 104137482 A | 11/2014 |
| CN | 104363142 A | 2/2015 |
| CN | 104461740 A | 3/2015 |
| CN | 104734875 A | 6/2015 |
| CN | 104794028 A | 7/2015 |
| CN | 105045871 A | 11/2015 |
| CN | 102907167 B | 1/2016 |
| CN | 105634832 A | 6/2016 |
| CN | 105955824 A | 9/2016 |
| CN | 106502835 A | 3/2017 |
| EP | 3110106 A1 | 12/2016 |
| WO | 2011041253 A1 | 4/2011 |
| WO | 2013037314 A1 | 3/2013 |
| WO | 2014080438 A1 | 5/2014 |

* cited by examiner

Disaster recovery policy parameter

| Redundancy mode | Master DC identifier | Backup DC identifier | Backup proportion | Service interface backup point |
|---|---|---|---|---|
| N-way | DC#1 | DC#2 | 50% | Yes |
| | | DC#3 | 50% | No |
| | DC#2 | DC#3 | 30% | Yes |
| | | DC#1 | 70% | No |
| | DC#3 | DC#1 | 50% | Yes |
| | | DC#2 | 50% | No |

Primary resource deployment topology information

| DC identifier | Resource type | Resource identifier | Resource unit | Quantity of resources | Service specifications | Configuration/ Running status |
|---|---|---|---|---|---|---|
| DC#1 | LB | N#100 | RU#01 | 2 | 100 k users | Configuration: primary/ Running: primary |
| | SP | N#200 | RU#01 | 4 | 100 k users | Configuration: primary/ Running: primary |
| | DB | N#300 | RU#01 | 2 | 100 k users | Configuration: primary/ Running: primary |
| DC#2 | LB | N#101 | RU#01 | 3 | 150 k users | Configuration: primary/ Running: primary |
| | SP | N#201 | RU#01 | 6 | 150 k users | Configuration: primary/ Running: primary |
| | DB | N#301 | RU#01 | 3 | 150 k users | Configuration: primary/ Running: primary |
| DC#3 | LB | N#102 | RU#01 | 4 | 200 k users | Configuration: primary/Running: primary |
| | SP | N#202 | RU#01 | 8 | 200 k users | Configuration: primary/ Running: primary |
| | DB | N#302 | RU#01 | 4 | 200 k users | Configuration: primary/ Running: primary |

TO FIG. 7B

FIG. 7A

Disaster recovery resource deployment topology information

| DC identifier | Resource type | Resource identifier | Resource unit | Quantity of resources | Service specifications | Configuration/ Running status | Peer DC identifier | Peer resource identifier | Peer resource unit |
|---|---|---|---|---|---|---|---|---|---|
| DC#1 | LB | N#100 | RU#02 | 4 | 200 k users | Configuration: backup/ Running: backup | DC#3 | N#102 | RU#01 |
| | SP | N#200 | RU#02 | 5 | 105 k users | Configuration: backup/ Running: backup | DC#2 | N#201 | RU#01 |
| | | | | | | | DC#3 | N#202 | RU#01 |
| | DB | N#300 | RU#02 | 3 | 105 k users | Configuration: backup/ Running: backup | DC#2 | N#301 | RU#01 |
| | | N#300 | RU#03 | 2 | 100 k users | Configuration: backup/ Running: backup | DC#3 | N#302 | RU#01 |
| DC#2 | LB | N#101 | RU#02 | 2 | 100 k users | Configuration: backup/ Running: backup | DC#1 | N#100 | RU#01 |
| | SP | N#201 | RU#02 | 4 | 100 k users | Configuration: backup/ Running: backup | DC#1 | N#200 | RU#01 |
| | | | | | | | DC#3 | N#202 | RU#01 |
| | DB | N#301 | RU#02 | 1 | 50 k users | Configuration: backup/ Running: backup | DC#1 | N#300 | RU#01 |
| | | N#301 | RU#03 | 2 | 100 k users | Configuration: backup/ Running: backup | DC#3 | N#302 | RU#01 |
| DC#3 | LB | N#102 | RU#02 | 3 | 150 k users | Configuration: backup/ Running: backup | DC#2 | N#101 | RU#01 |
| | SP | N#202 | RU#02 | 2 | 50 k users | Configuration: backup/ Running: backup | DC#1 | N#200 | RU#01 |
| | | | | | | | DC#2 | N#201 | RU#01 |
| | DB | N#302 | RU#02 | 1 | 50 k users | Configuration: backup/ Running: backup | DC#1 | N#300 | RU#01 |
| | | N#302 | RU#03 | 1 | 45 k users | Configuration: backup/ Running: backup | DC#2 | N#301 | RU#01 |

CONT. FROM FIG. 7A

FIG. 7B

Disaster recovery policy parameter

| Redundancy mode | Master DC identifier | Backup DC identifier | Backup proportion | Service interface backup point |
|---|---|---|---|---|
| N-way | DC#1 | DC#2 | 50% | Yes |
|  |  | DC#3 | 50% | No |
|  | DC#2 | DC#3 | 30% | Yes |
|  |  | DC#1 | 70% | No |
|  | DC#3 | DC#1 | 50% | Yes |
|  |  | DC#2 | 50% | No |

Global primary resource deployment topology information

CONT. FROM FIG. 8A

| DC identifier | Resource type | Resource identifier | Resource unit | Quantity of resources | Service specifications | Configuration /Running status | Interface/ Service identifier |
|---|---|---|---|---|---|---|---|
| DC#1 | LB | N#100 | RU #01 | 2 | 100 k users | Configuration: primary/Running: primary | Interface tokens 1–100 |
| DC#1 | SP | N#200 | RU #01 | 4 | 100 k users | Configuration: primary/Running: primary | Service tokens 1–1000 |
| DC#1 | DB | N#300 | RU #01 | 2 | 100 k users | Configuration: primary/Running: primary | |
| DC#2 | LB | N#101 | RU #01 | 3 | 150 k users | Configuration: primary/Running: primary | Interface tokens 101–250 |
| DC#2 | SP | N#201 | RU #01 | 6 | 150 k users | Configuration: primary/Running: primary | Service tokens 1001–2500 |
| DC#2 | DB | N#301 | RU #01 | 3 | 150 k users | Configuration: primary/Running: primary | |
| DC#3 | LB | N#102 | RU #01 | 4 | 200 k users | Configuration: primary/Running: primary | Interface tokens 251–450 |
| DC#3 | SP | N#202 | RU #01 | 8 | 200 k users | Configuration: primary/Running: primary | Service tokens 2501–4500 |
| DC#3 | DB | N#302 | RU #01 | 4 | 200 k users | Configuration: primary/Running: primary | |

Disaster recovery resource deployment topology information

CONT. FROM FIG. 8B

| DC identifier | Resource type | Resource identifier | Resource unit | Quantity of resources | Service specifications | Configuration/ Running status |
|---|---|---|---|---|---|---|
| DC#1 | LB | N#100 | RU#02 | 4 | 200 k users | Configuration: backup/ Running: backup |
| | SP | N#200 | RU#02 | 5 | 105 k users | Configuration: backup/ Running: backup |
| | DB | N#300 | RU#02 | 3 | 105 k users | Configuration: backup/ Running: backup |
| | | N#300 | RU#03 | 2 | 100 k users | Configuration: backup/ Running: backup |
| DC#2 | LB | N#101 | RU#02 | 2 | 100 k users | Configuration: backup/ Running: backup |
| | SP | N#201 | RU#02 | 4 | 100 k users | Configuration: backup/ Running: backup |
| | DB | N#301 | RU#02 | 1 | 50 k users | Configuration: backup/ Running: backup |
| | | N#301 | RU#03 | 2 | 100 k users | Configuration: backup/ Running: backup |
| DC#3 | LB | N#102 | RU#02 | 3 | 150 k users | Configuration: backup/ Running: backup |
| | SP | N#202 | RU#02 | 2 | 50 k users | Configuration: backup/ Running: backup |
| | DB | N#302 | RU#02 | 1 | 50 k users | Configuration: backup/ Running: backup |
| | | N#302 | RU#03 | 1 | 45 k users | Configuration: backup/ Running: backup |

FIG. 8C

Service data backup policy

| DC identifier | Interface/Service identifier | Peer DC identifier | Peer resource identifier | Peer resource unit |
|---|---|---|---|---|
| DC#1 | Interface tokens 1–100 | DC#2 | N#101 | RU#02 |
| DC#1 | Service tokens 1–500 | DC#2 | N#301 | RU#02 |
| DC#1 | Service tokens 501–1000 | DC#3 | N#302 | RU#02 |
| DC#2 | Interface tokens 101–250 | DC#3 | N#102 | RU#02 |
| DC#2 | Service tokens 1001–2050 | DC#1 | N#300 | RU#02 |
| DC#2 | Service tokens 2051–2500 | DC#3 | N#302 | RU#02 |
| DC#3 | Interface tokens 251–450 | DC#1 | N#100 | RU#02 |
| DC#3 | Service tokens 2501–3500 | DC#1 | N#300 | RU#02 |
| DC#3 | Service tokens 3501–4500 | DC#2 | N#301 | RU#02 |

CONT. FROM FIG. 8B

DISASTER RECOVERY DEPLOYMENT METHOD, APPARATUS, AND SYSTEM

CROSS-REFERENCE TO RELATED APPLICATIONS

This application is a continuation of International Application No. PCT/CN2018/079516, filed on Mar. 20, 2018, which claims priority to Chinese Patent Application No. 201710170186.9, filed on Mar. 21, 2017. The disclosures of the aforementioned applications are hereby incorporated by reference in their entireties.

TECHNICAL FIELD

This application relates to the field of network application technologies, and in particular, to a disaster recovery deployment method, apparatus, and system.

BACKGROUND

With continuous development of information technologies, network service processing systems that are based on network functions virtualization (NFV) and cloud computing are increasingly widely applied.

A network service processing system usually includes a plurality of data centers (DCs), and each data center is responsible for processing its own services. To improve reliability of a service processed by each data center, operators usually perform disaster recovery and backup on the service of each data center.

In related technologies, when performing disaster recovery and backup on a master data center of a network service processing system, an administrator of the network service processing system may manually determine a backup policy based on a running status of each data center, to be specific, determine a backup data center to which a service of the master data center is backed up and a quantity of disaster recovery resources that need to be deployed in each backup data center, and then the administrator manually arranges the corresponding backup resources in each backup data center and controls backup and storage of data corresponding to the service of the master data center to each backup data center. In this way, when the master data center becomes faulty, the backup resources in the backup data centers will take over the service of the master data center.

In the related technologies, the administrator needs to manually deploy the disaster recovery resources in each backup data center, and manual operations in the disaster recovery deployment are relatively complex. Consequently, efficiency of the disaster recovery deployment is relatively low.

SUMMARY

To improve efficiency of disaster recovery deployment, embodiments of this application provide a disaster recovery deployment method, apparatus, and system.

According to a first aspect, a disaster recovery deployment method is provided. The method is used in a disaster recovery deployment system that includes a master data center and at least one backup data center, and the method includes: obtaining, by the master data center, disaster recovery control information, where the disaster recovery control information is used to indicate a disaster recovery resource to be deployed by the at least one backup data center for a service of the master data center and a backup relationship of data corresponding to the service of the master data center in the at least one backup data center, and the disaster recovery resource is a resource used to perform disaster recovery and backup on the service of the master data center; sending, by the master data center, the data corresponding to the service of the master data center to the at least one backup data center based on the disaster recovery control information; obtaining, by the backup data center, the disaster recovery control information; deploying, by the backup data center, a disaster recovery resource for the master data center based on the disaster recovery control information; and receiving, by the backup data center, the data sent by the master data center, and backing up the received data.

In the foregoing method, the master data center and the backup data center automatically back up resources and data based on the disaster recovery control information, and an administrator does not need to manually configure the disaster recovery resource in each backup data center. Therefore, manual operation steps in a disaster recovery deployment process are simplified, and efficiency of disaster recovery deployment is improved.

Optionally, when obtaining the disaster recovery control information, the master data center may receive a disaster recovery policy parameter sent by a management device, and generate the disaster recovery control information based on the disaster recovery policy parameter, where the disaster recovery policy parameter is used to instruct to back up the service of the master data center to the at least one backup data center.

Optionally, when obtaining the disaster recovery control information, the master data center receives the disaster recovery control information generated and sent by another data center.

In the foregoing method, any data center may generate the disaster recovery control information and synchronize the generated disaster recovery control information to another data center. The data center that generates the disaster recovery control information may be referred to as a disaster recovery control center, and the disaster recovery control center may be the master data center or may be another data center different from the master data center. After data centers, including the master data center and the at least one backup data center, determine the disaster recovery control center through mutual election, when generating the disaster recovery control information, the disaster recovery control center receives the disaster recovery policy parameter sent by the management device, generates the disaster recovery control information based on the disaster recovery policy parameter, and synchronizes the generated disaster recovery control information to other data centers.

Optionally, when generating the disaster recovery control information based on the disaster recovery policy parameter, the master data center may: generate disaster recovery resource deployment topology information based on the disaster recovery policy parameter, where the disaster recovery resource deployment topology information is used to indicate the disaster recovery resource to be deployed by the at least one backup data center for the service of the master data center; and generate data backup policy information based on the disaster recovery policy parameter, where the data backup policy information is used to indicate the backup relationship of the data corresponding to the service of the master data center in the at least one backup data center.

Optionally, when generating the disaster recovery resource deployment topology information based on the disaster recovery policy parameter, the master data center may: obtain specifications of the service of the master data center; determine, based on the specifications of the service of the master data center and a backup proportion of the data corresponding to the service of the master data center in the at least one backup data center, a quantity of disaster recovery resources to be deployed by the at least one backup data center for the service of the master data center; and generate the disaster recovery resource deployment topology information that includes the quantity of disaster recovery resources to be deployed by the at least one backup data center for the service of the master data center.

In the foregoing method, a specific disaster recovery resource deployment topology information method is provided.

Optionally, when deploying the disaster recovery resource for the master data center based on the disaster recovery control information, the backup data center applies, based on the quantity of disaster recovery resources to be deployed for the service of the master data center, for a disaster recovery resource that is lacking in the backup data center, or releases a disaster recovery resource that is redundant in the backup data center.

Optionally, when generating the data backup policy information based on the disaster recovery policy parameter, the master data center may: obtain identifiers of data sets of the service of the master data center; generate a correspondence between the disaster recovery resource in the at least one backup data center and identifiers of data sets that are to be backed up in the at least one backup data center and that are of the service of the master data center based on the identifiers of the data sets of the service of the master data center and a backup proportion of the service of the master data center in the at least one backup data center; and generate the data backup policy information that includes the correspondence between the disaster recovery resource in the at least one backup data center and the identifiers of the data sets that are to be backed up in the backup data center and that are of the service of the master data center.

In the foregoing method, a specific data backup policy information method is provided.

Optionally, when sending the data corresponding to the service of the master data center to the at least one backup data center based on the disaster recovery control information, the master data center may send the data corresponding to the service of the master data center to a corresponding backup data center based on the correspondence between the disaster recovery resource in the at least one backup data center and the identifiers of the data sets that are to be backed up in the backup data center and that are of the service of the master data center; and when backing up the received data, the backup data center may store the data sent by the master data center in the corresponding disaster recovery resource based on the correspondence between the disaster recovery resource in the at least one backup data center and the identifiers of the data sets that are to be backed up in the backup data center and that are of the service of the master data center.

Optionally, the method further includes:

when the master data center becomes faulty, the backup data center obtains a first status adjustment instruction; and the backup data center adjusts a status of the disaster recovery resource deployed by the backup data center to a running state based on the first status adjustment instruction, so that the disaster recovery resource deployed by the backup data center processes the corresponding service of the master data center based on the backed-up data.

In the foregoing method, a method for taking over, by the backup data center, the processing of the service of the master data center when the master data center is faulty is provided.

Optionally, the method further includes: when the master data center recovers to normal, obtaining, by the backup data center, a data fail-back instruction, and sending the data that corresponds to the service of the master data center and that is stored in the backup data center to the master data center based on the data fail-back instruction; receiving, by the master data center, the data sent by the at least one backup data center; and obtaining, by the master data center, a second status adjustment instruction, and adjusting a status of a primary resource in the master data center to a running state based on the second status adjustment instruction, so that the primary resource processes the corresponding service of the master data center based on the data sent by the at least one backup data center, where the primary resource is a resource used to process a service of the master data center.

In the foregoing method, a method for failing back the service of the master data center when the master data center recovers from a failure is provided.

Optionally, the method further includes: obtaining, by the backup data center, a configuration parameter, where the configuration parameter is a parameter sent by a configuration coordination center based on a query result obtained after the configuration coordination center obtains the disaster recovery control information and the configuration parameter and queries, based on the disaster recovery control information, a data center that backs up the service of the master data center, and the configuration coordination center is any data center different from the backup data center, or the configuration parameter is a parameter sent by the management device to the backup data center, and the configuration parameter is used to configure resources corresponding to the service of the master data center; and configuring, by the backup data center based on the configuration parameter, the disaster recovery resource to be deployed in the backup data center.

In the foregoing method, the configuration parameter used to configure the primary resource corresponding to the service of the master data center may be coordinated and configured, based on the disaster recovery control information, to the disaster recovery resource to be deployed by the backup data center for the master data center, so that a configuration of the primary resource corresponding to the service of the master data center is consistent with a configuration of the backup resource to be deployed by the backup data center for the master data center.

According to a second aspect, a master data center is provided. The master data center includes a processor and a communications interface. The communications interface is controlled by the processor, and the processor is configured to perform all or some steps performed by the master data center in the disaster recovery deployment method according to the first aspect and optional solutions of the first aspect.

According to a third aspect, a backup data center is provided. The backup data center includes a processor and a communications interface. The communications interface is controlled by the processor, and the processor in the device is configured to perform all or some steps performed by the backup data center in the disaster recovery deployment method according to the first aspect and optional solutions of the first aspect.

According to a fourth aspect, a disaster recovery deployment apparatus is provided. The apparatus includes at least one unit, where the at least one unit is configured to perform all or some steps performed by a master data center in the disaster recovery deployment method according to the first aspect and optional solutions of the first aspect; or the at least one unit is configured to perform all or some steps performed by a backup data center in the disaster recovery deployment method according to the first aspect and optional solutions of the first aspect.

According to a fifth aspect, a computer readable storage medium is provided. The computer readable storage medium stores an executable program, where the executable program may be a program used to perform all or some steps performed by a master data center in the disaster recovery deployment method according to the first aspect and optional solutions of the first aspect; or the executable program may be a program used to perform all or some steps performed by a backup data center in the disaster recovery deployment method according to the first aspect and optional solutions of the first aspect.

BRIEF DESCRIPTION OF DRAWINGS

FIG. 6a-1 to FIG. 6a-3 are a flowchart of a disaster recovery deployment method according to an embodiment of this application;

FIG. 6b-1 to FIG. 6b-3 are a flowchart of fail-over and service fail-back methods according to an embodiment of this application;

FIG. 7A and FIG. 7B are a schematic diagram of a correspondence between a disaster recovery policy parameter, primary resource deployment topology information, and disaster recovery resource deployment topology information according to an embodiment of this application;

FIG. 8A to FIG. 8D are a schematic diagram of a correspondence between a disaster recovery policy parameter, primary resource deployment topology information, disaster recovery resource deployment topology information, and data backup policy information according to an embodiment of this application;

DESCRIPTION OF EMBODIMENTS

To make the objectives, technical solutions, and advantages of this application clearer, the following further describes the implementations of this application in detail with reference to the accompanying drawings.

A conventional telecommunications system includes various dedicated hardware devices, and different hardware devices are used for different applications. As networks grow in size, the system becomes increasingly complex and brings many challenges, including development and launch of a new service, operation and maintenance of the system, resource utilization, and so on. To address these challenges, a network functions virtualization (NFV) technology is put forward in the industry.

The network functions virtualization technology may be briefly understood as migrating functions of network elements used in a telecommunications network from an existing dedicated hardware platform to a general commercial off-the-shelf (COTS) server. After being transformed into independent applications by using the NFV technology, the network elements used in the telecommunications network may be flexibly deployed on a unified infrastructure platform that is built based on standard devices such as a server, a storage, and a switch. In addition, infrastructure hardware device resources are pooled and virtualized by using the virtualization technology, to provide virtual resources for an upper-layer application, so that applications and hardware are decoupled. In this way, virtual resources can be quickly added to each application to quickly scale up a system capacity, or virtual resources can be quickly reduced to quickly scale down a system capacity, so that resiliency of the network is greatly improved. With a shared resource pool formed by general COTS servers, no hardware device needs to be independently deployed for a newly developed service, thereby significantly reducing a time to launch the new service.

A basis of NFV technology includes a cloud computing technology and a virtualization technology. General COTS computing, storage, network, and other hardware devices may be decomposed into various virtual resources by using the virtualization technology, for use by various upper-layer applications. Applications and hardware are decoupled by using the virtualization technology, so that provision of virtual resources is greatly accelerated. In addition, auto scaling of an application can be implemented by using the cloud computing technology, to match virtual resources with service loads. This not only increases utilization of virtual resources, but also increases a system response rate.

Figure 1:
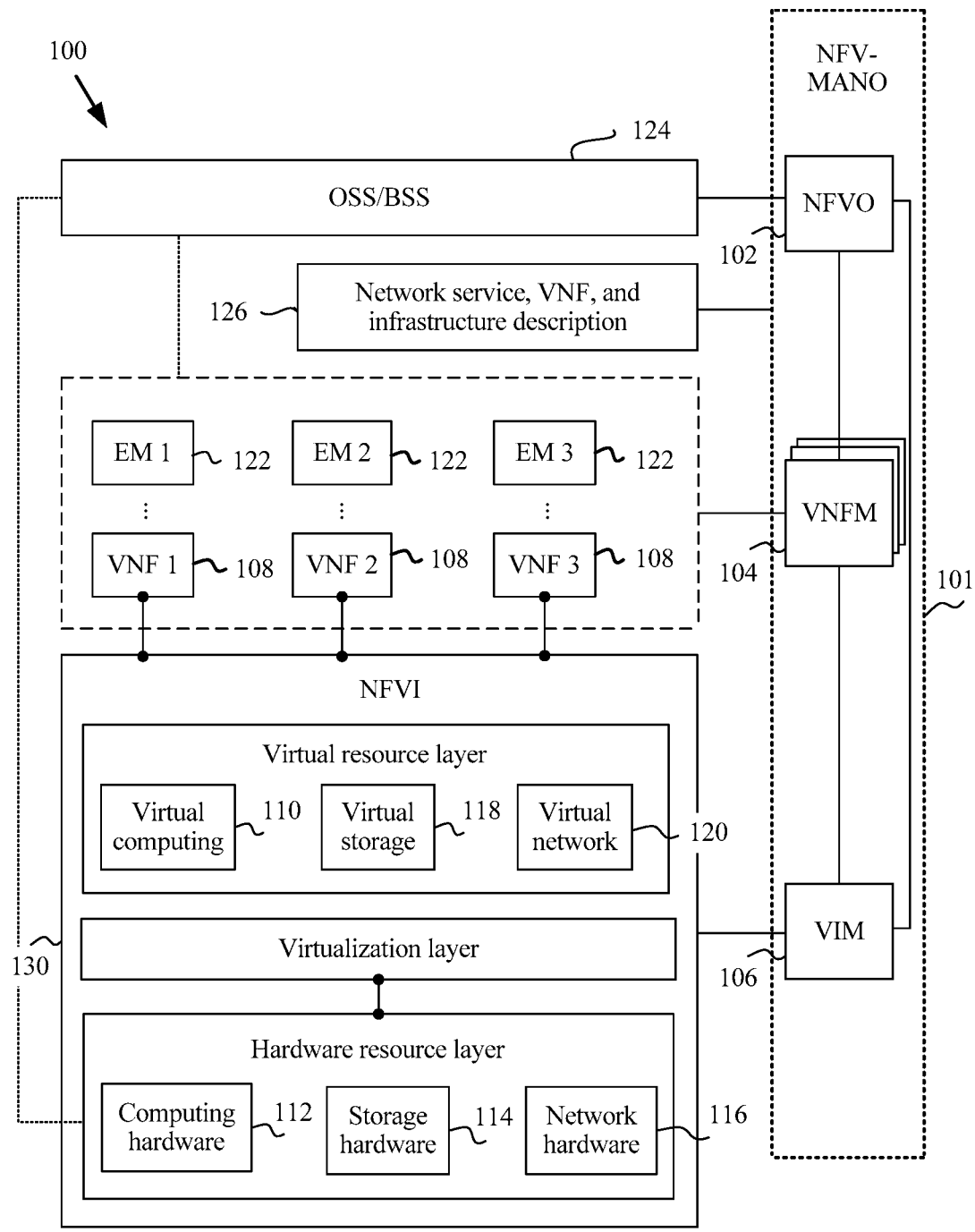
FIG. 1 is an architectural diagram of an NFV system according to this application.

FIG. 1 is an architectural diagram of an NFV system. An NFV system 100 may be used in various networks, for example, a data center network, a carrier network, or a local area network. The NFV system 100 includes one NFV management and orchestration (NFV MANO) system 101, an NFV infrastructure (NFVI) layer 130, a plurality of virtualized network functions (VNF) 108, a plurality of element management (EM) 122, a "network service, VNF, and infrastructure description" 126, and a business support management system (Operation-Support System/Business Support System, OSS/BSS) 124. The NFV management and orchestration system 101 includes an NFV orchestrator (NFVO) 102, one or more VNFMs (VNF Managers) 104, and a virtualized infrastructure manager (VIM) 106. The NFVI 130 includes computing hardware 112, storage hardware 114, network hardware 116, a virtualization layer, virtual computing 110, virtual storage 118, and a virtual network 120. The network service, VNF, and infrastructure description 126 and the OSS/BSS 124 are further discussed in the ETSI GS NFV 002 V1.1.1 standard.

The NFV management and orchestration (NFV MANO) system 101 is configured to monitor and manage the VNFs 108 and the NFVI 130. The NFVO 102 may implement network services (such as L2 and L3 VPN services) on the NFVI 130, or may execute resource-related requests from the one or more VNFMs 104, send configuration information to the VNFMs 104, and collect status information of the VNFs 108. In addition, the NFVO 102 may communicate with the VIM 106 to allocate and/or reserve a resource and exchange configuration and status information of a virtualized hardware resource. The VNFM 104 may manage the one or more VNFs 108. The VNFM 104 may perform various management functions, for example, instantiate, update, query, scale up and down, and/or terminate the VNFs 108. The VIM 106 may perform resource management functions, such as a function of managing infrastructure resource allocation (for example, adding a resource to a virtual container) and operations (for example, collecting NFVI failure information). The VNFM 104 and the VIM 106 may communicate with each other to allocate a resource and exchange configuration and status information of a virtualized hardware resource.

The NFVI 130 includes a hardware resource, a software resource, or a combination thereof for deploying a virtualized environment. In other words, the hardware resource and the virtualization layer are used to provide virtualized resources, for example, by serving as a virtual machine and a virtual container in another form, and are used for the VNFs 108. The hardware resource includes the computing hardware 112, the storage hardware 114, and the network hardware 116. The computing hardware 112 may be existing hardware in the market and/or customized hardware and is configured to provide processing and computing resources. The storage hardware 114 may be a storage capacity provided in a network or a storage capacity (a local memory in a server) resident in the storage hardware 114. In an implementation solution, resources of the computing hardware 112 and the storage hardware 114 may be aggregated together. The network hardware 116 may be a switch, a router, and/or any other network device that is configured to provide a switching function. The network hardware 116 may cross a plurality of domains, and may include a plurality of networks formed by one or more interconnected transport networks.

The virtualization layer in the NFVI 130 can abstract the hardware resource from a physical layer and decouple the VNFs 108, to provide a virtualized resource to the VNFs 108. A virtual resource layer includes the virtual computing 110, the virtual storage 118, and the virtual network 120. The virtual computing 110 and the virtual storage 118 may be provided in a form of virtual machines and/or other virtual containers for the VNFs 108. For example, one VNF 108 may be deployed on one virtual machine, or different functional parts of one VNF 108 may be deployed on a plurality of different virtual machines. Optionally, a plurality of virtual machines may run on one physical host. In another possible scenario, one or more VNFs 108 may be deployed on one physical host.

The virtualization layer abstracts the network hardware 116 to form the virtual network 120. The virtual network 120 may include virtual switches, and the virtual switches are configured to provide connections between the virtual machine and other virtual machines. In addition, in the transport networks of the network hardware 116, virtualization may be implemented by using a centralized control plane and one independent forwarding plane (for example, a software-defined network (SDN)).

As shown in FIG. 1, the VNFM 104 may interact with the VNFs 108 and the EM 122 to manage life cycles of the VNFs and exchange configuration and status information. The VNFs 108 may be configured as at least one virtualized network function performed by one physical network device. For example, in an implementation solution, the VNFs 108 may be configured to provide functions provided by different network elements in an IMS network, for example, network functions such as a P-SCSCF, an S-CSCF, or an HSS, and the EM 122 is configured to manage the one or more VNFs 108.

Figure 2:
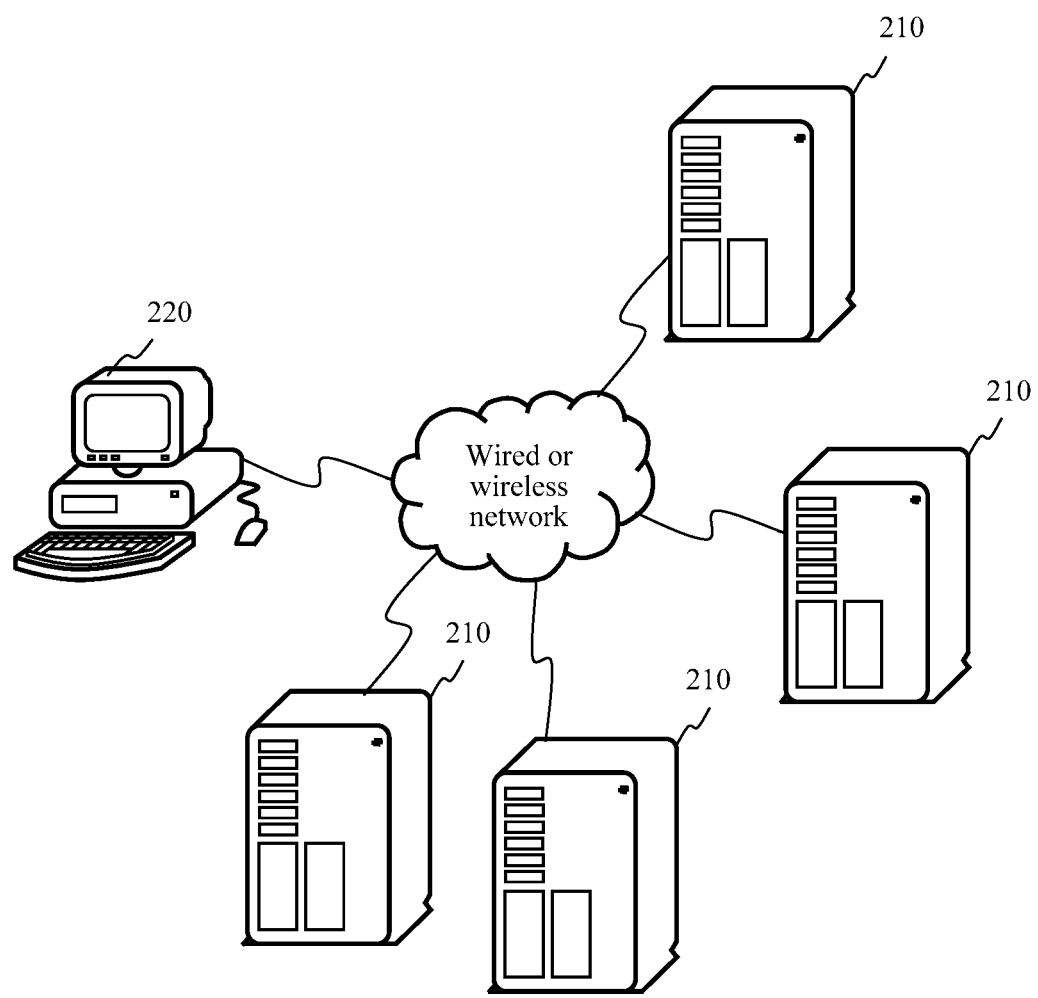
FIG. 2 is an architectural diagram of a disaster recovery deployment system according to this application.

FIG. 2 is an architectural diagram of a disaster recovery deployment system according to an embodiment of this application. The disaster recovery deployment system includes at least two data centers 210.

In this embodiment of this application, each data center 210 may be one application server, and the data centers 210 may be separately deployed at different geographical locations. Each data center 210 is responsible for processing its own services. For example, each data center 210 may be responsible for processing services of a region in which the data center 210 is located, or each data center 210 may be responsible for processing one type of service or a plurality of types of services.

The at least two data centers 210 are connected to each other by using a wired or wireless network. For example, the at least two data centers 210 are separately connected to the Internet, and are networked with each other by using the Internet.

Optionally, the disaster recovery deployment system may further include a management device 220.

The management device 220 may include the foregoing EM, NFV MANO, and the like.

The management device 220 is connected to the at least two data centers 210 by using a wired or wireless network.

In this embodiment of this application, the at least two data centers 210 may back up a service for each other, and each data center may back up the service of the data center to at least one other data center. The data center for which backup is performed may be referred to as a master data center, and the at least one data center that performs backup on the master data center may be referred to as a backup data center. In other words, each data center may have a correspondence between one master data center and at least one backup data center.

In this embodiment of the present disclosure, the at least two data centers 210 are data centers based on an NFV technology. Specifically, the at least two data centers 210 may be implemented as the NFVI in the NFV system shown in FIG. 1; and in each data center, service processing and backup functions run in a form of the VNF.

Figure 3:
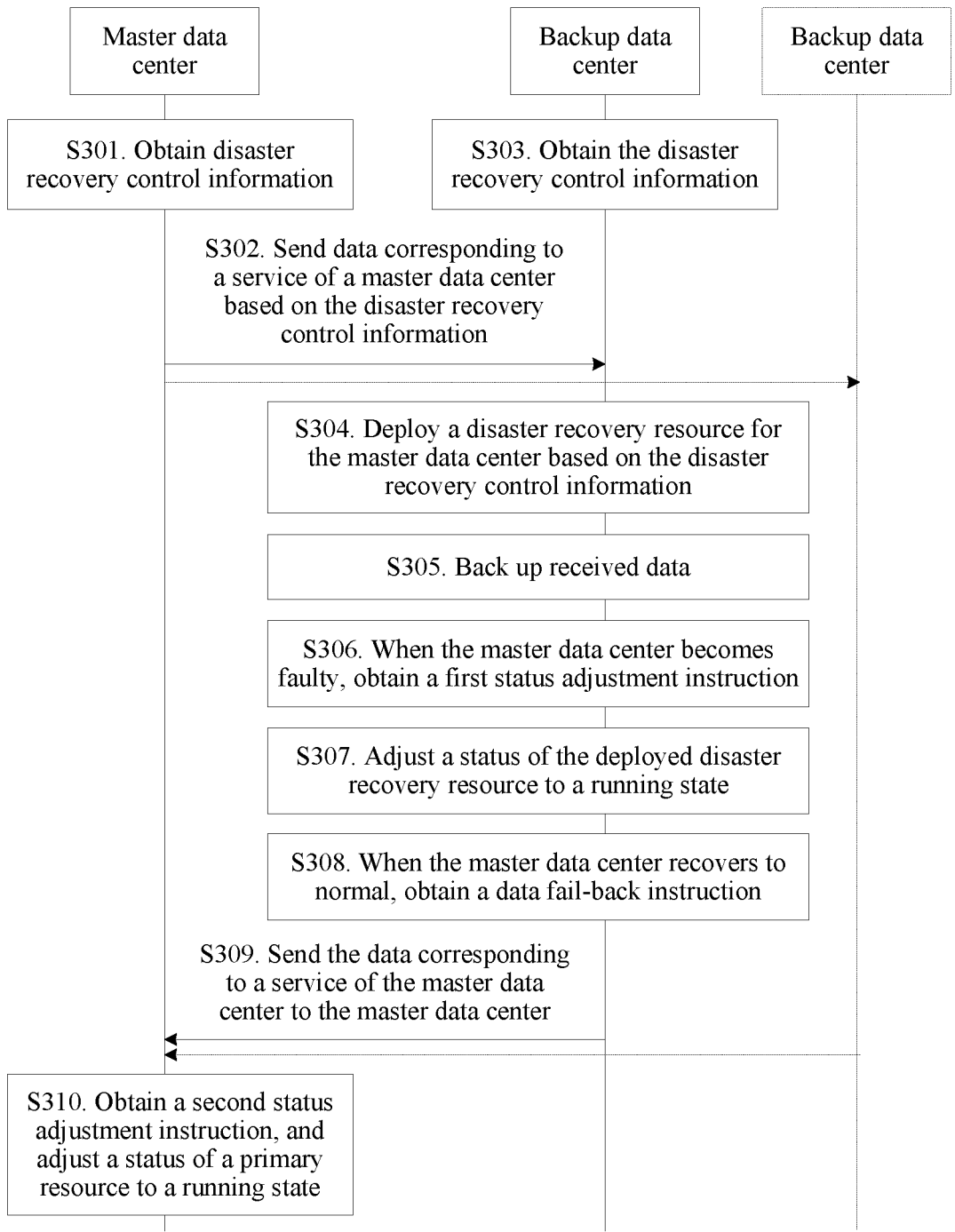
FIG. 3 is a flowchart of a disaster recovery deployment method according to an example embodiment of this application.

FIG. 3 is a flowchart of a disaster recovery deployment method according to an example embodiment of this application. The method may be used in the network service processing system shown in FIG. 1. One master data center and at least one backup data center are used as an example. As shown in FIG. 3, the disaster recovery deployment method may include the following steps.

Step 301. The master data center obtains disaster recovery control information.

The disaster recovery control information is used to indicate a disaster recovery resource to be deployed by the at least one backup data center for a service of the master data center and a backup relationship of data corresponding to the service of the master data center in the at least one backup data center, and the disaster recovery resource is a resource used to perform disaster recovery and backup on the service of the master data center.

The master data center may receive a disaster recovery policy parameter sent by a management device, and generate the disaster recovery control information based on the disaster recovery policy parameter, where the disaster recovery policy parameter is used to instruct to back up the service of the master data center to the at least one backup data center. Alternatively, the master data center may receive the disaster recovery control information generated and sent by another data center.

In this embodiment of this application, the disaster recovery policy parameter may be delivered by an administrator to one (where in this embodiment of this application, this data center may be referred to as a disaster recovery control center) of the at least two data centers by using the management device, and the disaster recovery control center generates the disaster recovery control information based on the disaster recovery policy parameter. When a disaster recovery control center is the master data center, the master data center generates the disaster recovery control information based on the disaster recovery policy parameter, and sends the generated disaster recovery control information to the at least one backup data center. When the disaster recovery control center is not the master data center, after generating the disaster recovery control information, the disaster recovery control center sends the disaster recovery control information to the master data center, and the master data center receives the disaster recovery control information.

In a possible implementation, the disaster recovery control center may be a data center determined by at least two data centers in the network service processing system through election based on a predetermined election algorithm. For example, when data centers in the network service processing system go online, the data centers perform topology discovery between each other, and determine a disaster recovery control center through election based on a result of the topology discovery. When a user subsequently needs to deploy disaster recovery or needs to adjust existing disaster recovery deployment, the user may deliver a disaster recovery policy parameter to the disaster recovery control center by using a management device. If the disaster recovery control center becomes faulty, remaining data centers redetermine a new data center as a disaster recovery control center by using the election algorithm.

In this embodiment of this application, in an example in which the disaster recovery control center is the master data center, when generating the disaster recovery control information, the master data center may generate disaster recovery resource deployment topology information based on the disaster recovery policy parameter, and generate data backup policy information based on the disaster recovery policy parameter, where the disaster recovery resource deployment topology information is used to indicate the disaster recovery resource to be deployed by the at least one backup data center for the service of the master data center, and the data backup policy information is used to indicate the backup relationship of the data corresponding to the service of the master data center in the at least one backup data center.

Specifically, when generating the disaster recovery resource deployment topology information based on the disaster recovery policy parameter, the master data center may: obtain specifications of the service of the master data center; determine, based on the specifications of the service of the master data center and a backup proportion of the data corresponding to the service of the master data center in the at least one backup data center, a quantity of disaster recovery resources to be deployed by the at least one backup data center for the service of the master data center; and generate the disaster recovery resource deployment topology information that includes the quantity of disaster recovery resources to be deployed by the at least one backup data center for the service of the master data center.

The backup proportion of the data corresponding to the service of the master data center in the at least one backup data center may be explicit. For example, the disaster recovery policy parameter may directly include the backup proportion.

Alternatively, the backup proportion may be implicit. For example, when the master data center is a disaster recovery control center, the master data center may predetermine the backup proportion based on a quantity of the at least one backup data center. Specifically, the master data center may evenly back up the service of the master data center to the at least one backup data center through preconfiguration. If there are two backup data centers, the backup proportion of the data corresponding to the service of the master data center in each of the at least one backup data center is 50%, or if there are four backup data centers, the backup proportion of the data corresponding to the service of the master data center in each of the at least one backup data center is 25%, and so on.

In this embodiment of this application, specifications of a service of a data center may be a quantity of users of the service. The disaster recovery resource may be a VNF module, each VNF module may be referred to as a unit resource, and the quantity of disaster recovery resources is a quantity of unit resources. In addition, there may be only one type of unit resource in each data center, and the unit resource is used to perform all functions in a service processing process; or there may be a plurality of types of unit resources, and each unit resource is used to perform different functions in a service processing process.

Step 302. The master data center sends the data corresponding to the service of the master data center to the at least one backup data center based on the disaster recovery control information, and the at least one backup data center receives the data sent by the master data center.

The master data center may send the data corresponding to the service of the master data center to the corresponding backup data center based on a correspondence between a disaster recovery resource in the at least one backup data center and identifiers of data sets that are to be backed up in the backup data center and that are of the service of the master data center.

For each backup data center, the master data center may send, to the backup data center, data sets that are to be backed up in the backup data center and that are of the service of the master data center based on a correspondence between identifiers of data sets that are to be backed up in the backup data center and that are of the service of the master data center and an identifier of a disaster recovery resource to be deployed by the backup data center for the service of the master data center.

For example, it is assumed that the master data center is a DC#1, and the at least one backup data center is a DC#2 and a DC#3. In the example, the DC#1 determines that identifiers of data sets that are to be backed up in the DC#2 are service tokens 1 to 500, and identifiers of data sets that are to be backed up in the DC#3 are service tokens 501 to 1000. Based on the data backup policy information in the disaster recovery control information, the DC#1 sends data corresponding to the service tokens 1 to 500 to the DC#2, and sends data corresponding to the service tokens 501 to 1000 to the DC#3.

Step 303. The backup data center obtains the disaster recovery control information.

A manner of obtaining the disaster recovery control information by the backup data center is similar to a method for obtaining the disaster recovery control information by the master data center. For example, when the disaster recovery control center is a backup data center, the backup data center generates the disaster recovery control information based on the disaster recovery policy parameter, and sends the generated disaster recovery control information to the master data center and other backup data centers; or when the disaster recovery control center is not the backup data center, after generating the disaster recovery control information, the disaster recovery control center sends the disaster recovery control information to the backup data center.

Step 304. The backup data center deploys a disaster recovery resource for the master data center based on the disaster recovery control information.

The backup data center may apply, based on the quantity of disaster recovery resources to be deployed by the backup data center for the service of the master data center, for a disaster recovery resource that is lacking in the backup data center, or release a disaster recovery resource that is redundant in the backup data center.

For example, two type-A unit resources and one type-B unit resource are required for backing up the service of the master data center (DC#1) by the backup data center (DC#2). If the DC#2 does not include any existing unit resource used for backing up a service of another data center, the DC#2 may apply to the management device for deployment of two type-A unit resources and one type-B unit resource as disaster recovery resources in the DC#1; or if the DC#2 includes one existing type-A unit resource and two existing type-B unit resources that are used for backing up a service of another data center, the DC#2 may apply to the management device for deployment of one more type-A unit resource and release of one type-B unit resource.

Optionally, in this embodiment of this application, in addition to backing up the service of the master data center, the backup data center may back up services of other data centers. In this case, when deploying disaster recovery resources for the master data center and the other data centers, the backup data center may separately deploy independent disaster recovery resources for the master data center and the other data centers.

Because there is a relatively low probability that a data center becomes faulty, when the master data center works properly, and in the backup data center, some types of disaster recovery resources used for backup of the master data center are idle, to reduce a quantity of disaster recovery resources and increase resource utilization, the backup data center may deploy a common disaster recovery resource for the master data center and other data centers when the backup data center deploys disaster recovery resources for both the master data center and the other data centers. In this case, a quantity of this type of disaster recovery resource deployed by the backup data center for the master data center and the other data centers needs to be not less than a largest value of quantities of this type of disaster recovery resource required in each of the master data center and the other data centers.

In addition, for other types of disaster recovery resources, when deploying disaster recovery resources for both the master data center and the other data centers, the backup data center may deploy this type of disaster recovery resource only for one of the master data center and the other data centers.

For example, it is assumed that there are three types of unit resources: a load balance (LB) module, a service processing (SP) module, and a database (DB) module. The LB module is used to distribute a received service request to the SP module, the SP module is used to process the service request distributed by the LB module, and the DB module is used to store data corresponding to a service. When the service of the master data center is backed up in the at least one backup data center, only one backup data center needs to deploy an LB module for the master data center; and when the master data center works properly, an SP module deployed for the master data center in at least one backup data center is in an idle state. Therefore, when a backup data center deploys, for both the master data center and other data centers, SP modules used for disaster recovery and backup, a quantity of SP modules deployed for disaster recovery and backup may be a largest value of quantities of SP modules required in each of the master data center and the other data centers. Because when the master data center works properly, a DB module that is used for disaster recovery and backup and that is deployed for the master data center in a backup data center needs to store the data corresponding to the service of the master data center, when a backup data center deploys, for both the master data center and the other data centers, SP modules used for disaster recovery and backup, the backup data center needs to separately deploy, for the master data center and the other data centers, a DB module that is used for disaster recovery and backup.

Step 305. The backup data center backs up the received data.

The backup data center stores the data sent by the master data center in a corresponding disaster recovery resource based on the correspondence between the disaster recovery resource in the at least one backup data center and the identifiers of the data sets that are to be backed up in the backup data center and that are of the service of the master data center. For example, when the disaster recovery control information includes the correspondence between the disaster recovery resource in the at least one backup data center and the identifiers of the data sets that are to be backed up in the backup data center and that are of the service of the master data center, the backup data center that receives the data may back up the data to the corresponding disaster recovery resource based on the correspondence.

Step 306. When the master data center becomes faulty, the backup data center obtains a first status adjustment instruction.

The first status adjustment instruction may be generated and sent by any data center different from the master data center and the backup data center to the backup data center. Alternatively, the first status adjustment instruction may be generated by the backup data center.

The first status adjustment instruction may be generated by the disaster recovery control center. It can be learned from the foregoing description of the disaster recovery control center in step 301 that the disaster recovery control center may be one of the at least one backup data center or may be another data center (different from the master data center) different from the at least one backup data center.

For example, the disaster recovery control center may obtain a communication status between the disaster recovery control center and the master data center, and receive a communication status that is collected and reported by another data center different from the master data center and the disaster recovery control center and that is between the another data center and the master data center. The communication status may include a normal communication state and an abnormal communication state. The disaster recovery control center determines whether the master data center is faulty based on the obtained and received communication states. For example, when most of the communication states obtained and received by the disaster recovery control center are abnormal communication states, the disaster recovery control center may determine that the master data center is faulty. In this case, the disaster recovery control center generates the first status adjustment instruction and sends the first status adjustment instruction to each backup data center.

Step 307. The backup data center adjusts a status of the disaster recovery resource deployed by the backup data center to a running state based on the first status adjustment instruction, so that the disaster recovery resource deployed by the backup data center processes the corresponding service of the master data center based on the backed-up data.

In this embodiment of this application, an initial status of the disaster recovery resource deployed by the backup data center for the master data center is a non-running state. When obtaining the first status adjustment instruction, the backup data center may adjust the status of the disaster recovery resource to the running state, and at this time, the disaster recovery resource may take over and process the service of the master data center.

Step 308. When the master data center recovers to normal, the backup data center obtains a data fail-back instruction.

The data fail-back instruction may also be generated and sent by any data center different from the master data center and the backup data center to the backup data center. Alternatively, the data fail-back instruction may be generated by the backup data center.

Alternatively, the data fail-back instruction may be generated by the disaster recovery control center. For example, the disaster recovery control center obtains a communication status between the disaster recovery control center and the master data center and a communication status that is collected and reported by another data center different from the disaster recovery control center and that is between the another data center and the master data center. When determining, based on the obtained and received communication states, that the master data center has recovered from a failure (for example, when most of the communication states obtained and received by the disaster recovery control center are normal communication states, the disaster recovery control center may determine that the master data center has recovered from a failure), the disaster recovery control center generates the data fail-back instruction and sends the data fail-back instruction to each backup data center.

Step 309. The backup data center sends the data that corresponds to the service of the master data center and that is stored in the backup data center to the master data center based on the data fail-back instruction, and the master data center receives the data sent by the at least one backup data center.

After receiving or generating the data fail-back instruction, the backup data center starts to send the data that corresponds to the service of the master data center and that is stored in the disaster recovery resource of the backup data center to the master data center. After receiving the data sent by the at least one backup data center, the master data center stores the received data in a primary resource in the master data center. Different from a backup resource, the primary resource is a resource used to process a service of the master data center.

Step 310. The master data center obtains a second status adjustment instruction, and adjusts a status of the primary resource in the master data center to a running state based on the second status adjustment instruction, so that the primary resource processes the corresponding service of the master data center based on the data sent by the at least one backup data center.

After the master data center recovers from a failure, the primary resource in the master data center is in a non-running state by default, and only when the master data center receives the second status adjustment instruction does the master data center adjust the status of the primary resource to the running state to start to process the service of the master data center.

Alternatively, the second status adjustment instruction may be generated and sent by the disaster recovery control center to the master data center.

For example, after sending data corresponding to the service of the master data center, a backup data center different from the disaster recovery control center may report a data sending completion indication to the disaster recovery control center, and after determining that each backup data center sends data corresponding to the service of the master data center, the disaster recovery control center may generate the second status adjustment instruction and send the second status adjustment instruction to the master data center.

Optionally, in this embodiment of this application, the backup data center may further obtain a third status adjustment instruction, and adjust a status of a backup resource in the backup data center to a non-running state based on the third status adjustment instruction, to stop processing the service of the master data center. A manner of obtaining the third status adjustment instruction by the backup data center is similar to a manner of obtaining the first status adjustment instruction and the data fail-back instruction. Details are not described herein again.

Optionally, when generating the second status adjustment instruction, the disaster recovery control center may generate the third status adjustment instruction at the same time, and send the third status adjustment instruction to each backup data center.

In actual application, hardware in different data centers may be different, and specifications of services supported by a same type of unit resource in different data centers may be different. Therefore, in step 301, when generating the disaster recovery control information, the disaster recovery control center also needs to consider a difference between specifications of services supported by unit resources in different data centers.

Figure 4:
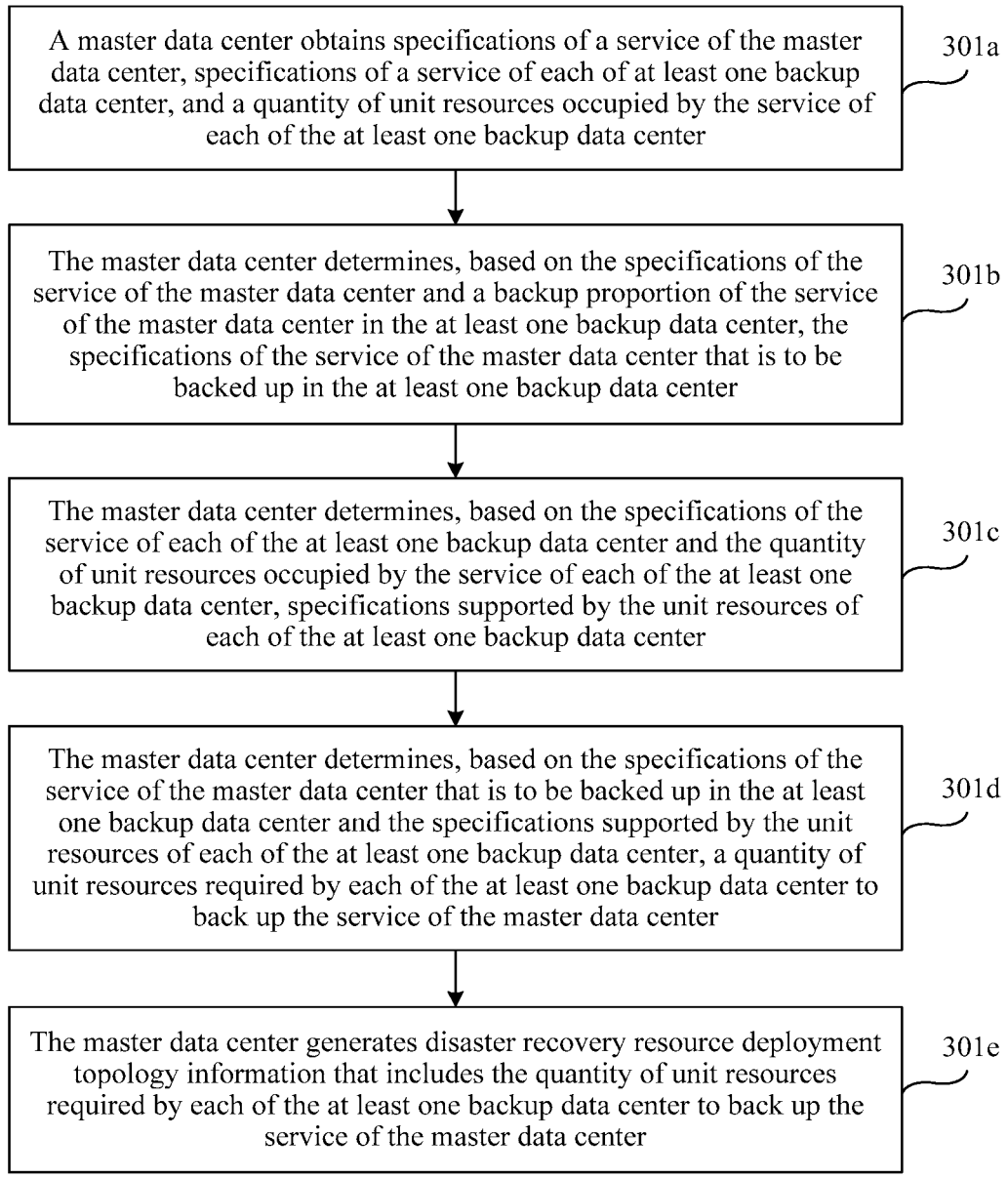
FIG. 4 is a flowchart of a method for generating disaster recovery resource deployment topology information according to an embodiment of this application.

FIG. 4 is a flowchart of a method for generating disaster recovery resource deployment topology information according to an embodiment of this application. When a disaster recovery control center is a master data center, the solution shown in step 301*a* to step 301*e* in FIG. 4 may be an implementation of obtaining the disaster recovery resource deployment topology information in the disaster recovery control information by the disaster recovery control center in step 301. The implementation is described below.

Step 301*a*. The master data center obtains specifications of a service of the master data center, specifications of a service of each of the at least one backup data center, and a quantity of unit resources occupied by the service of each of the at least one backup data center.

In this embodiment of this application, the specifications of the service of each of the at least one backup data center and the quantity of unit resources occupied by the service of each of the at least one backup data center may be collected and reported by each backup data center to the master data center.

Step 301b. The master data center determines, based on the specifications of the service of the master data center and a backup proportion of the service of the master data center in the at least one backup data center, the specifications of the service of the master data center that is to be backed up in the at least one backup data center.

For example, assuming that the master data center is a DC#1, the at least one backup data center is a DC#2 and a DC#3, backup proportions of the service of the service of the DC#1 in the DC#2 and the DC#3 are both 50%, and the specifications of the service of the DC#1 is 100 k (to be specific, the DC#1 provides the service for a maximum of 100 k users), the DC#1 may determine that specifications of the service of the DC#1 that is to be separately backed up in the DC#2 and the DC#3 are both 50 k.

Step 301c. The master data center determines, based on the specifications of the service of each of the at least one backup data center and the quantity of unit resources occupied by the service of each of the at least one backup data center, specifications of a service supported by the unit resources of each of the at least one backup data center.

Optionally, if the disaster recovery resource includes two or more types of unit resources, the master data center separately calculates the specifications of a service supported by each type of unit resource in the backup data center.

For example, it is assumed that the disaster recovery resource includes two types of unit resources: a type-A unit resource and a type-B unit resource. In this example, the master data center (DC#1) calculates specifications supported by a unit resource of one backup data center (DC#2). In the DC#2, specifications of a service of the DC#2 are 150 k, and the service of the DC#2 occupies six type-A unit resources and three type-B unit resources. In this case, the DC#1 may determine that, in the DC#2, specifications supported by each type-A unit resource is 25 k, and specifications supported by each type-B unit resource is 50 k.

Step 301d. The master data center determines, based on the specifications of the service of the master data center that is to be backed up in the at least one backup data center and the specifications supported by the unit resources of each of the at least one backup data center, a quantity of unit resources required by each of the at least one backup data center to back up the service of the master data center.

For example, the disaster recovery resource includes a type-A unit resource and a type-B unit resource. When determining the specifications supported by the unit resources of the backup data center (DC#2), the master data center (DC#1) may determine, based on the specifications (50 k) of the service of the DC#1 that is to be backed up in the DC#2, specifications supported by each type-A unit resource in the DC#2, and specifications supported by each type-B unit resource in the DC#2, that two type-A unit resources and one type-B unit resource are required by the DC#2 to back up the service of the DC#1.

Step 301e. The master data center generates the disaster recovery resource deployment topology information that includes the quantity of unit resources required by each of the at least one backup data center to back up the service of the master data center.

Optionally, in this embodiment of this application, the generated disaster recovery resource deployment topology information includes a quantity of disaster recovery resources that are to be deployed by the at least one backup data center for the service of the master data center (for example, the quantity of unit resources required by each of the at least one backup data center to back up the service of the master data center), or may include identifiers of the disaster recovery resources that are to be deployed by the at least one backup data center for the service of the master data center (for example, identifiers of the unit resources required by each of the at least one backup data center to back up the service of the master data center).

When generating data backup policy information based on a disaster recovery policy parameter, the master data center may: obtain identifiers of data sets of the service of the master data center; generate a correspondence between the disaster recovery resource in the at least one backup data center and identifiers of data sets that are to be backed up in the at least one backup data center and that are of the service of the master data center based on the identifiers of the data sets of the service of the master data center and a backup proportion of the service of the master data center in the at least one backup data center; and generate the data backup policy information that includes the correspondence between the disaster recovery resource in the at least one backup data center and the identifiers of the data sets that are to be backed up in the backup data center and that are of the service of the master data center.

Figure 5:
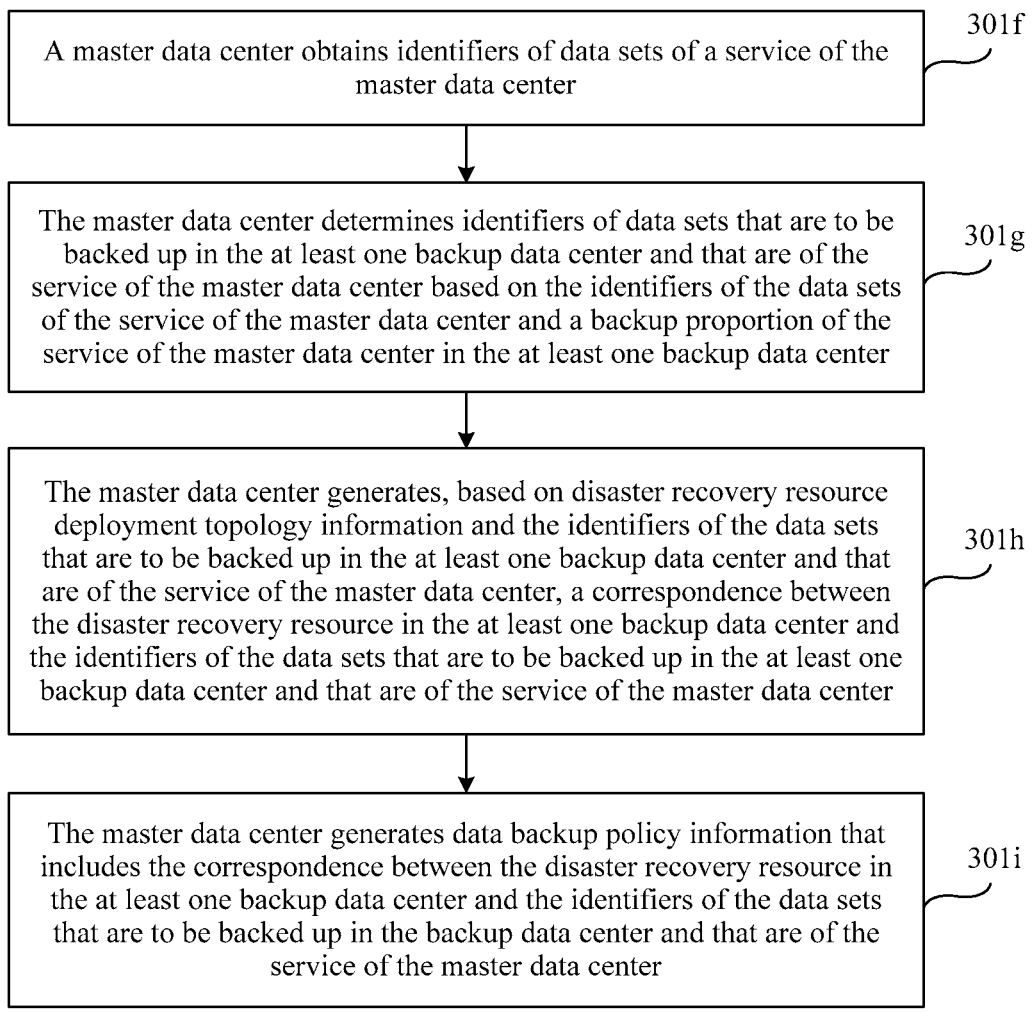
FIG. 5 is a flowchart of a method for generating data backup policy information according to an embodiment of this application.

When the disaster recovery resource deployment topology information includes the identifiers of the disaster recovery resources that are to be deployed by the at least one backup data center for the service of the master data center, the master data center may generate the data backup policy information based on the disaster recovery policy parameter and the disaster recovery resource deployment topology information. FIG. 5 is a flowchart of a method for generating data backup policy information according to an embodiment of this application. When a disaster recovery control center is the master data center, a solution shown in step 301f to step 301i in FIG. 5 may be an implementation of obtaining the data backup policy information by the disaster recovery control center in step 301. The implementation is described below.

Step 301f. The master data center obtains identifiers of data sets of the service of the master data center.

In this embodiment of this application, each data set may be data corresponding to services of a fixed quantity of users among services processed by the master data center. An identifier of each data set may be a service identifier (Token). For example, assuming that the specifications of the service of the master data center are 100 k, data of every 100 users forms one data set, and service tokens of the data sets are numbered from 1, identifiers of the data sets of the service of the master data center are service tokens 1 to 1000.

Step 301g. The master data center determines identifiers of data sets that are to be backed up in the at least one backup data center and that are of the service of the master data center based on the identifiers of the data sets of the service of the master data center and a backup proportion of the service of the master data center in the at least one backup data center.

For example, the master data center is a DC#1, the at least one backup data center is a DC#2 and a DC#3, and backup proportions of the service of the service of the DC#1 in the DC#2 and the DC#3 are both 50%. In this case, the DC#1 may determine that identifiers of data sets that are to be backed up in the DC#2 are service tokens 1 to 500, and identifiers of data sets that are to be backed up in the DC#3 are service tokens 501 to 1000.

Step 301*h*. The master data center generates, based on the disaster recovery resource deployment topology information and the identifiers of the data sets that are to be backed up in the at least one backup data center and that are of the service of the master data center, a correspondence between the disaster recovery resource in the at least one backup data center and the identifiers of the data sets that are to be backed up in the at least one backup data center and that are of the service of the master data center.

In this embodiment of this application, for each backup data center, the master data center may generate a correspondence between identifiers of data sets that are to be backed up in the backup data center and that are of the service of the master data center and an identifier of a disaster recovery resource to be deployed by the backup data center for the service of the master data center.

Step 301*i*. The master data center generates the data backup policy information that includes the correspondence between the disaster recovery resource in the at least one backup data center and the identifiers of the data sets that are to be backed up in the backup data center and that are of the service of the master data center.

Optionally, in this embodiment of this application, the backup data center may further obtain a configuration parameter, and configure, based on the configuration parameter, the disaster recovery resource to be deployed in the backup data center.

The configuration parameter is used to configure resources corresponding to the service of the master data center. In this embodiment of this application, to ensure that configurations of resources for a same service are consistent, after disaster recovery is configured for the master data center, when the resources corresponding to the service of the master data center need to be configured, not only an existing primary resource of the master data center needs to be configured, but also the disaster recovery resource to be deployed by the at least one backup data center for the master data center needs to be coordinated and configured.

The configuration parameter may be a parameter sent by a configuration coordination center to the backup data center. The configuration coordination center may be any data center different from the backup data center. For example, the configuration coordination center may obtain the disaster recovery control information (where an obtaining manner is similar to the manner of obtaining the disaster recovery control information by the master data center or the backup data center); and subsequently, when a management device needs to configure the primary resource of the master data center, the management device may send the corresponding configuration parameter to the configuration coordination center, and the configuration coordination center queries, based on the disaster recovery control information, a data center that backs up the service of the master data center, and sends, based on the query result, the configuration parameter to a backup data center that is found through query.

Alternatively, in another possible scenario, if the configuration coordination center is one of the backup data centers, the backup data center directly receives the configuration parameter sent by the management device.

Optionally, similar to the disaster recovery control center, the configuration coordination center may also be determined through election between data centers, and if the configuration coordination center becomes faulty, other data centers may determine a new configuration coordination center through re-election.

Optionally, in addition to coordinating the configuration parameter between the master data center and the backup data center, the configuration coordination center may coordinate a disaster recovery policy parameter between data centers. Specifically, when a user needs to deliver a disaster recovery policy parameter, the user may deliver the disaster recovery policy parameter to the configuration coordination center by using EM; the configuration coordination center synchronizes the disaster recovery policy parameter to other data centers including the disaster recovery control center; and after receiving the disaster recovery policy parameter synchronized from the configuration coordination center, the disaster recovery control center may generate the disaster recovery control information based on the disaster recovery policy parameter.

In addition, the disaster recovery control center and the configuration coordination center may be a same data center, or may be different data centers.

Optionally, in another possible implementation, the disaster recovery control center and the configuration coordination center may be network devices different from the at least two data centers.

In conclusion, according to the disaster recovery deployment method shown in this embodiment of this application, the master data center and the backup data center obtain the disaster recovery control information, where the disaster recovery control information is used to indicate the disaster recovery resource to be deployed by the at least one backup data center for the service of the master data center and the backup relationship of the data corresponding to the service of the master data center in the at least one backup data center, where the disaster recovery resource is a resource used to perform disaster recovery and backup on the service of the master data center; the master data center sends the data corresponding to the service of the master data center to the at least one backup data center based on the disaster recovery control information; and the backup data center deploys a disaster recovery resource for the master data center based on the disaster recovery control information, receives the data sent by the master data center, and backs up the received data. In the solution shown in this embodiment of this application, the master data center and the backup data center automatically back up resources and data based on the disaster recovery control information, and an administrator does not need to manually configure the disaster recovery resource in each backup data center. Therefore, manual operation steps in a disaster recovery deployment process are simplified, and efficiency of disaster recovery deployment is improved.

The foregoing embodiment of this application is described by using a backup relationship between one master data center and at least one backup data center as an example. In actual application, each of a plurality of data centers included in a network service processing system may serve as a master data center and back up a service of the master data center to the other data centers.

All the disaster recovery control-related steps (including election of a disaster recovery control center, generation of the disaster recovery control information, failure detection of the master data center, generation of the first status adjustment instruction, the second status adjustment instruction, the third status adjustment instruction, and the data fail-back instruction, and the like) performed by the disaster recovery control center and the configuration coordination-related steps (including election of a configuration coordination center, coordination and sending of the configuration parameter, and the like) performed by the configuration coordination center may be implemented by a VNF module of a data center.

Figures 1, 6A:
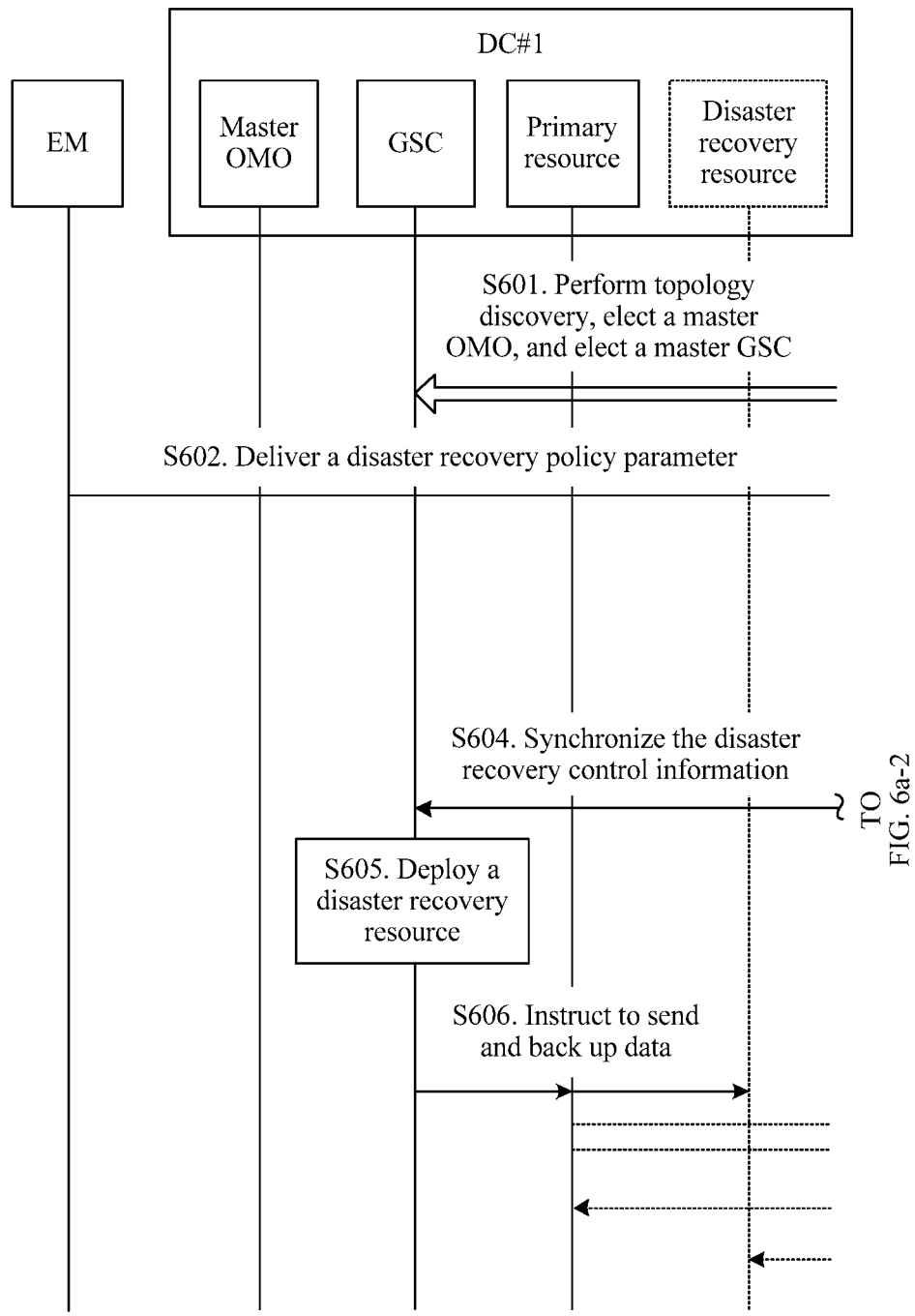
Figures 2, 6A:
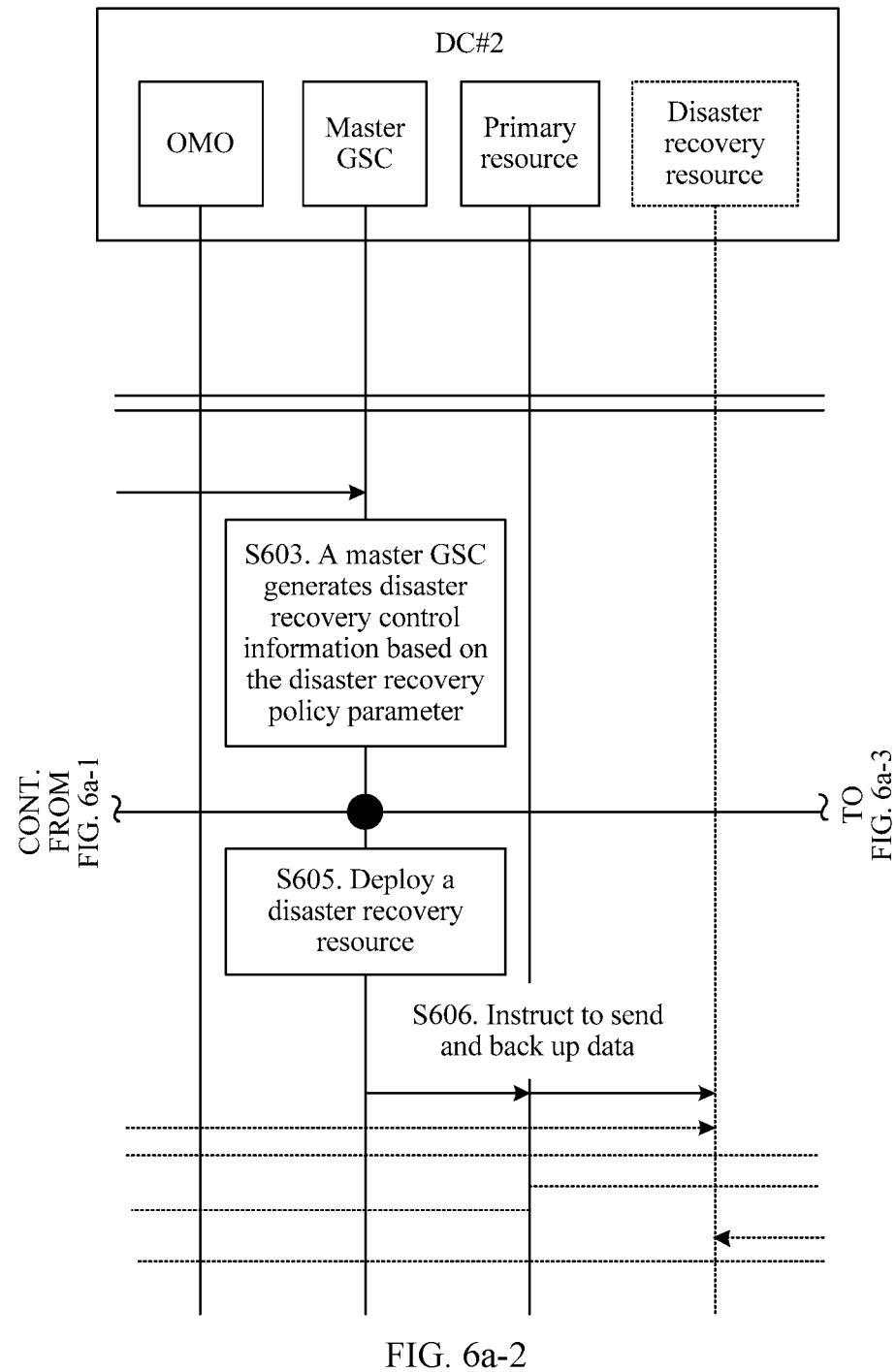
Figures 3, 6A:
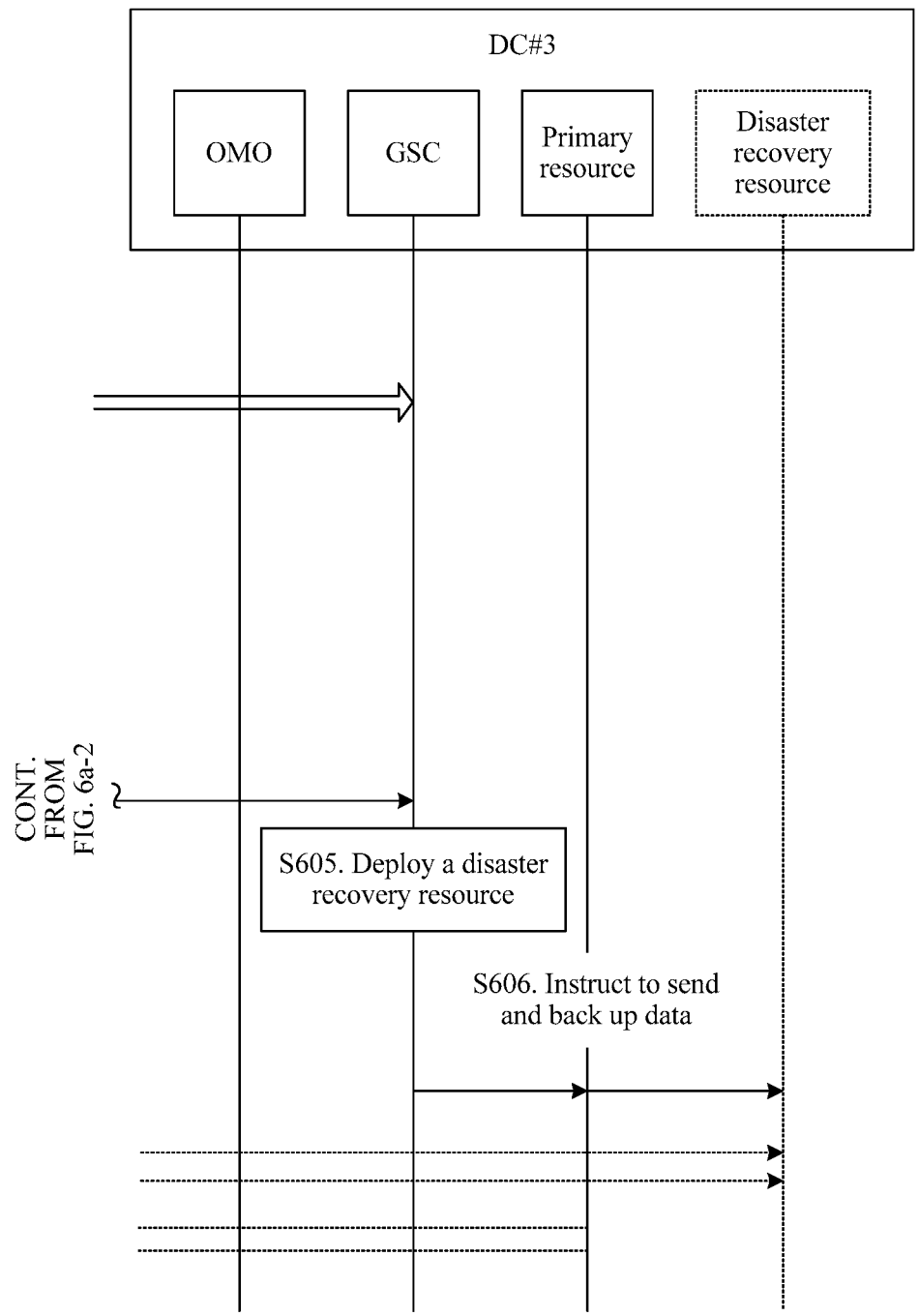

In an embodiment of this application, a disaster recovery aggregation management entity may be introduced to a data center. The disaster recovery aggregation management entity may include two VNF modules: a global service control (GSC) module and an operation and maintenance ordination (OMO) module. The GSC is responsible for performing a disaster recovery control-related step, and the OMO is responsible for performing a configuration coordination-related step. FIG. 6a-1 to FIG. 6a-3 are a flowchart of a disaster recovery deployment method according to an embodiment of this application. Mutual backup between three data centers (a DC#1, a DC#2, and a DC#3) in a network service processing system is used as an example. As shown in FIG. 6a-1 to FIG. 6a-3, the disaster recovery deployment method may include the following steps.

Step 601. The DC#1, the DC#2, and the DC#3 perform topology discovery between each other, determine a GSC in the DC#2 as a master GSC through election, and determine an OMO in the DC#1 as a master OMO through election.

The data center (DC#2) in which the master GSC is located is the foregoing disaster recovery control center, and the data center (DC#1) in which the master OMO is located is the foregoing configuration coordination center.

Specifically, in this embodiment of this application, GSCs in the data centers initiate the topology discovery between the data centers, and ultimately build a global topology relationship table between the data centers. The global topology relationship table may include information such as IDs and IP addresses of the data centers.

The GSCs in the data centers determine the master GSC through election based on a built global topology relationship, and correspondingly, the GSCs in other data centers different from the master GSC may be referred to as slave GSCs. In addition, the OMOs in the data centers determine the master OMO through election based on the built global topology relationship, and correspondingly, the OMOs in other data centers different from the master OMO may be referred to as slave OMOs.

The GSC in each data center collects function service information of the data center. The function service information may include information such as a quantity of primary resources, service specifications, a running status of the primary resource, a service interface corresponding to the primary resource, an identifier of service data, or the like of a service of the data center. Each slave GSC reports the collected function service information to the master GSC, and the master GSC gathers the function service information and generates primary resource deployment topology information.

Optionally, the OMO in each data center may independently plan a corresponding OMO address, and an OMO address list of the data centers is configured in the EM. The EM sets up OMO connections to the OMOs in the data centers based on the OMO address list. A connection between the EM and the master OMO is referred to as a master OMO connection, and a connection between the EM and a slave OMO is referred to as a slave OMO connection.

When the data center corresponding to the master OMO becomes faulty, the slave OMOs re-elect a new master OMO. When detecting that a data center to which a master OMO connection is set up becomes faulty, the EM attempts to set up a link again one by one based on the configured OMO address list.

The EM configures/operates, maintains, and manages the data centers by using the set-up master OMO connection. Specifically, the EM may deliver a configuration or operation and maintenance command to the master OMO by using the master OMO connection, and then the master OMO synchronizes the configuration or operation and maintenance command to the slave OMOs. The slave OMOs deliver, to local service function modules, the configuration or operation and maintenance command are obtained through synchronization, for example, primary resources, disaster recovery resources, or other VNF modules. The slave OMOs return execution results of the configuration or operation and maintenance command to the master OMO, and after determining that the configuration or operation and maintenance command of all the data centers are successfully executed, the master OMO returns a command execution success response to the EM; or if the configuration or operation and maintenance command of some data centers fail to be executed, the master OMO may instruct a data center in which the execution is successful to roll back the configuration or operation and maintenance command, and return a command execution failure response to the EM. In this way, it is ensured that configuration or operation and maintenance data is consistent between the data centers.

In addition, the OMOs may collect operation and maintenance information of the local service function modules, the slave OMOs reports the collected operation and maintenance information to the master OMO, and the master OMO gathers and merges the operation and maintenance information and then reports the operation and maintenance information to the EM by using the master OMO connection. Alternatively, the OMOs may directly report the collected operation and maintenance information of the service function modules to the EM by using the connections between the OMOs and the EM (namely, the foregoing master OMO connection and the slave OMO connections), and after the EM gathers and merges the operation and maintenance information, the operation and maintenance information is displayed in an interface of a network management system.

Step 602. The EM delivers a disaster recovery policy parameter to the master GSC in the DC#2, and the master GSC receives the disaster recovery policy parameter.

When a user initially configures disaster recovery relationships between the DC#1, the DC#2, and the DC#3, or when a user needs to adjust disaster recovery relationships between the DC#1, the DC#2, and the DC#3, the user may deliver the disaster recovery policy parameter to the master GSC in the DC#2 by using the EM. The disaster recovery policy parameter may include a redundancy mode, identifiers of a master DC and a slave DC in each disaster recovery relationship, a backup proportion of a master DC of each disaster recovery relationship in each slave DC, and a slave DC that serves as a service interface backup point of a master DC in each disaster recovery relationship. The service interface backup point refers to a slave DC of a backup service interface that externally provides a service of a master DC.

Specifically, when delivering the disaster recovery policy parameter to the master GSC, the EM may deliver the disaster recovery policy parameter to the master OMO in the DC#1 by using the master OMO connection, the master OMO synchronizes the disaster recovery policy parameter to the slave OMOs in the DC#2 and the DC#3, the slave OMOs in the DC#2 and the DC#3 deliver the received disaster recovery policy parameter to the GSCs in the DC#2 and the DC#3, and the master GSC in the DC#2 receives the disaster recovery policy parameter delivered by the slave OMO in the DC#2.

Alternatively, after receiving the disaster recovery policy parameter delivered by the EM, the master OMO may send the disaster recovery policy parameter only to the slave OMO in the DC#2, and the slave OMO in the DC#2 delivers the disaster recovery policy parameter to the master GSC.

Step 603. The master GSC generates disaster recovery control information (including disaster recovery resource deployment topology information and data backup policy information) based on the disaster recovery policy parameter.

The master GSC may first generate the disaster recovery resource deployment topology information based on the disaster recovery policy parameter and the primary resource deployment topology information, and then generate the data backup policy information based on the disaster recovery policy parameter and the disaster recovery resource deployment topology information.

For example, refer to FIG. 7A and FIG. 7B and FIG. 8A to FIG. 8D. FIG. 7A and FIG. 7B are a schematic diagram of a correspondence between a disaster recovery policy parameter, primary resource deployment topology information, and disaster recovery resource deployment topology information according to an embodiment of this application. FIG. 8A to FIG. 8D are a schematic diagram of a correspondence between a disaster recovery policy parameter, primary resource deployment topology information, disaster recovery resource deployment topology information, and data backup policy information according to an embodiment of this application.

As shown in FIG. 7A and FIG. 7B or FIG. 8A to FIG. 8D, a disaster recovery mode indicated by the disaster recovery policy parameter is N-way disaster recovery (or referred to as multi-party disaster recovery), and there are three corresponding disaster recovery relationships: When a master DC is a DC#1, slave DCs are a DC#2 and a DC#3, backup proportions of the service of the DC#1 in the DC#2 and the DC#3 are both 50%, a service interface backup point of the DC#1 is the DC#2; when a master DC is a DC#2, slave DCs are a DC#1 and a DC#3, backup proportions of the service of the DC#2 in the DC#1 and the DC#3 are 30% and 70% respectively, a service interface backup point of the DC#2 is the DC#3; when a master DC is a DC#3, slave DCs are a DC#1 and a DC#2, backup proportions of the service of the DC#3 in the DC#1 and the DC#2 are both 50%, and a service interface backup point of the DC#3 is the DC#1.

In FIG. 7A and FIG. 7B or FIG. 8A to FIG. 8D, unit resources in the data centers are classified into three types: LB, SP, and DB. In the primary resource deployment topology information shown in FIG. 7A and FIG. 7B or FIG. 8A to FIG. 8D, a first column shows identifiers of data centers, a second column shows types of unit resources serving as primary resources in the data centers, a third column and a fourth column show identifiers of the unit resources serving as the primary resources in the data centers, a fifth column shows a quantity of unit resources serving as the primary resources in the data centers, a sixth column shows specifications of services supported by the unit resources serving as the primary resources in the data centers, and a seventh column shows configuration statuses and running statuses of the unit resources serving as the primary resources in the data centers. The unit resources in the data centers are distinguished by a resource identifier number (N#digit in the figure) and a resource unit number (RU#digit in the figure). As shown in FIG. 7A and FIG. 7B or FIG. 8A to FIG. 8D, a resource identifier number of an LB in the DC#1 is N#100, and a resource unit number of the LB in the DC#1 is RU#01; and correspondingly, a resource identifier number of an SP in the DC#1 is N#200, and a resource unit number of the SP in the DC#1 is RU#01. In addition, the configuration status indicates whether a corresponding resource is a primary resource or a backup resource. All the unit resources in the primary resource deployment topology information are primary resources, and corresponding configuration statuses are also "primary". The running status indicates whether a corresponding resource is running. All the unit resources in the primary resource deployment topology information are currently in a running state, and the corresponding running statuses are all "primary."

In the disaster recovery resource deployment topology information shown in FIG. 7A and FIG. 7B or FIG. 8A to FIG. 8D, a first column shows identifiers of data centers, a second column shows types of unit resources serving as backup resources in the data centers, a third column and a fourth column show identifiers of the unit resources serving as the backup resources in the data centers, a fifth column shows a quantity of unit resources serving as the backup resources in the data centers, a sixth column shows specifications of services backed up by the unit resources serving as the backup resources in the data centers, a seventh column shows configuration statuses and running statuses of the unit resources serving as the backup resources in the data centers, an eighth column shows identifiers (identifying specific data centers backed up by the corresponding backup resources) of peer disaster recovery ends corresponding to the unit resources serving as the backup resources in the data centers, and a ninth column and a tenth column show identifiers of primary resources in the peer disaster recovery ends corresponding to the unit resources serving as the backup resources in the data centers. It should be noted that, in the disaster recovery resource deployment topology information shown in FIG. 7A and FIG. 7B or FIG. 8A to FIG. 8D, a quantity of LBs serving as backup resources is determined based on service specifications of a peer end of which a service interface is backed up by the LBs. For example, in FIG. 7A and FIG. 7B or FIG. 8A to FIG. 8D, a peer end of which a service interface is backed up by the DC#1 is the DC#3 (in other words, a service interface backup point of the DC#3 is the DC#1), service specifications of the DC#3 are 200 k users, and each LB in the DC#1 supports 50 k users. Therefore, a quantity of LBs serving as backup resources in the DC#1 is 200 k/50 k=4. A quantity of SPs serving as backup resources is a larger value of quantities of SPs required to perform backup on the other two data centers. For example, SPs serving as backup resources in the DC#1 are used as an example. If specifications of the service of DC#2 that is to be backed up by the DC#1 are 150 k users*70%=105 k users, a quantity of required SPs is 3, and if specifications of the service of the DC#3 that is to be backed up by the DC#1 are 200 k users*50%=100 k users, a quantity of required SPs is 2. In this case, the quantity of SPs serving as backup resources in the DC#1 is 3. DBs serving as backup resources are separately set based on the specifications of the other two data centers that are to be backed up by the LBs. For example, DBs serving as backup resources in the DC#1 are used as an example. Specifications of the DC#2 and the DC#3 that are to be backed up in the DC#1 are 105 k users and 100 k users respectively. In this case, three DBs and two DBs are set in the DC#1 respectively for the DC#2 and the DC#3 as backup DBs.

Because all the unit resources in the disaster recovery resource deployment topology information serve as backup resources, all corresponding backup states are "backup." Correspondingly, when the master data center is normal, a backup resource in a backup data center does not process any service. Therefore, all corresponding running statuses are also "backup", indicating that corresponding backup resources are in a non-running state.

The primary resource deployment topology information shown in FIG. 8A to FIG. 8D further includes interface identifiers and service identifiers of services of the data centers. For example, in FIG. 8A to FIG. 8D, for a service of the DC#1, interface identifiers are interface tokens 1 to 100, and service identifiers are service tokens 1 to 1000. In the data backup policy information shown in FIG. 8A to FIG. 8D, a first column shows identifiers of master data centers, a second column shows interface identifiers and data set identifiers of services that are to be backed up in backup data centers and that are of the master data centers, a third column shows identifiers (indicates specific data centers to which interfaces and data of the services of the master data centers are backed up) of peer disaster recovery ends that back up interfaces and data of the services of the master data centers, and a fourth column and a fifth column show identifiers of backup resources in the peer disaster recovery ends that back up the interfaces and the data of the services of the master data centers. For example, in FIG. 8A to FIG. 8D, the DC#1 is a master data center, and all interfaces of services in the DC#1 are backed up to the DC#2. Therefore, the data backup policy information shown in FIG. 8A to FIG. 8D indicates that all the interfaces (corresponding to interface tokens 1 to 100) of the services in the DC#1 are backed up to an LB serving as a backup resource in the DC#2. In addition, because 50% of the data corresponding to the services in the DC#1 is backed up in the DC#2 and the other 50% is backed up in the DC#3, half of the service data (corresponding to service tokens 1 to 500) of the services in the DC#1 is backed up to a DB serving as a backup resource in the DC#2, and the other half of the service data (corresponding to service tokens 501 to 1000) is backed up to a DB serving as a backup resource in the DC#3.

Step 604. The master GSC synchronizes the generated disaster recovery control information to each slave GSC, and each slave GSC receives and stores the disaster recovery control information.

After generating the disaster recovery control information, the master GSC in the DC#2 separately sends the disaster recovery control information to the GSCs in the DC#1 and the DC#3.

Step 605. Each GSC deploys a disaster recovery resource based on the disaster recovery resource deployment topology information in the disaster recovery control information.

For example, the disaster recovery resource deployment topology information shown in FIG. 7A and FIG. 7B or FIG. 8A to FIG. 8D is used as an example. After obtaining the disaster recovery resource deployment topology information, based on quantities of LBs, SPs, and DBs serving as disaster recovery resources that are indicated in the disaster recovery resource deployment topology information, the GSC in the DC#1 deploys four LBs used for disaster recovery and five SPs used for disaster recovery, deploys three DBs used for disaster recovery of services of the DC#2, and deploys two DBs used for disaster recovery of services of the DC#3. The GSC in the DC#1 also deploys, based on the disaster recovery resource deployment topology information shown in FIG. 7A and FIG. 7B or FIG. 8A to FIG. 8D, corresponding quantities of LBs, SPs, and DBs serving as backup resources.

Step 606. Based on the data backup policy information in the disaster recovery control information, each GSC instructs a DB in a primary resource to send local service data to a peer disaster recovery end serving as a backup data center, and instructs a DB in a disaster recovery resource to receive and store data sent by a peer disaster recovery end serving as a master data center.

For example, the data backup policy information shown in FIG. 7A and FIG. 7B or FIG. 8A to FIG. 8D is used as an example. The DC#1 may instruct a DB in a primary resource to send data corresponding to service tokens 1 to 500 to a DB that performs backup on the DC#1 in the DC#2, and send data corresponding to service tokens 501 to 1000 to a DB that performs backup on the DC#1 in the DC#3. In addition, the DC#1 may instruct a DB that performs backup on the DC#2 in the DC#1, to receive and back up data sent by the DC#2, and instruct a DB that performs backup on the DC#3, to receive and back up data sent by the DC#3.

Figures 1, 6B:
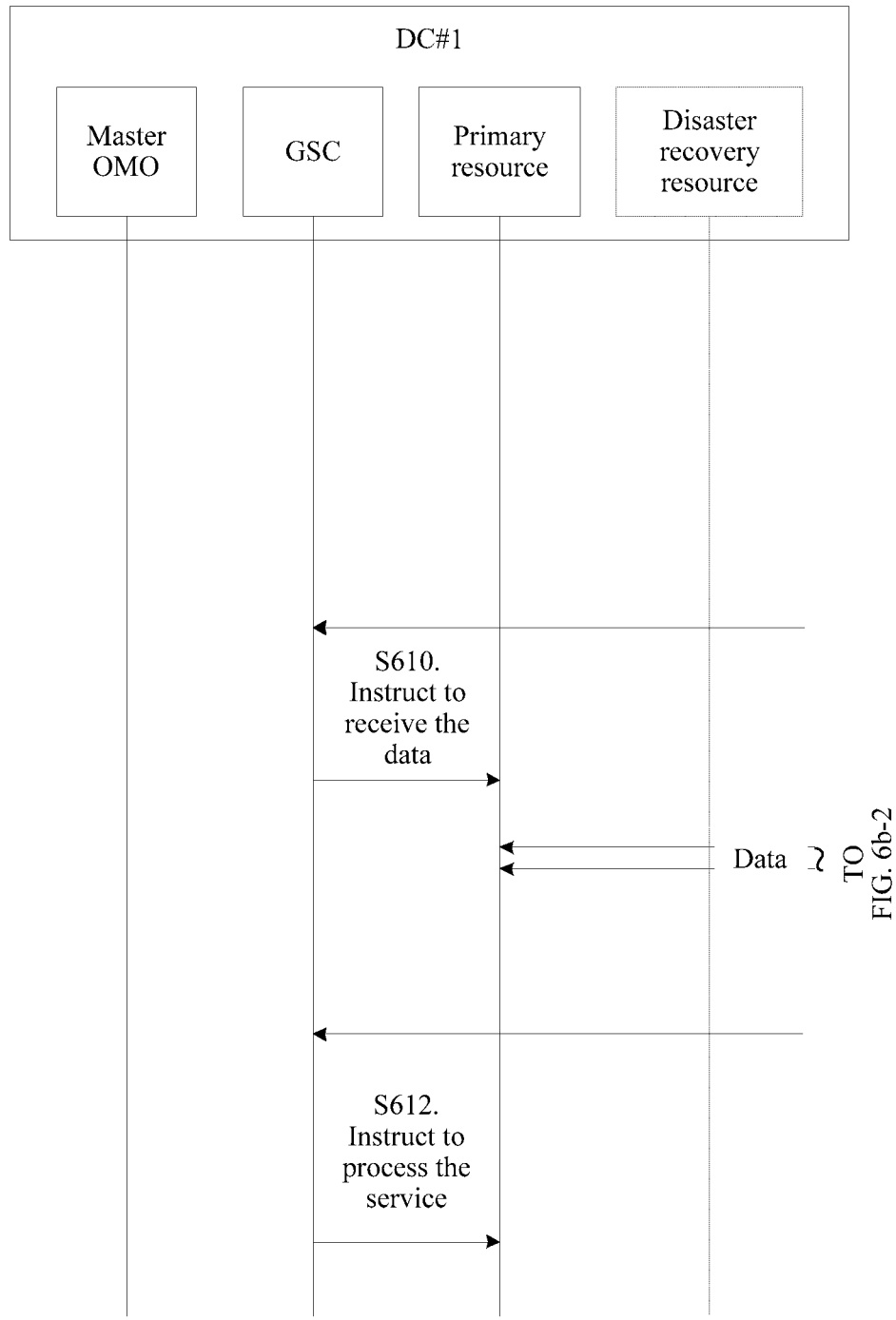
Figures 2, 6B:
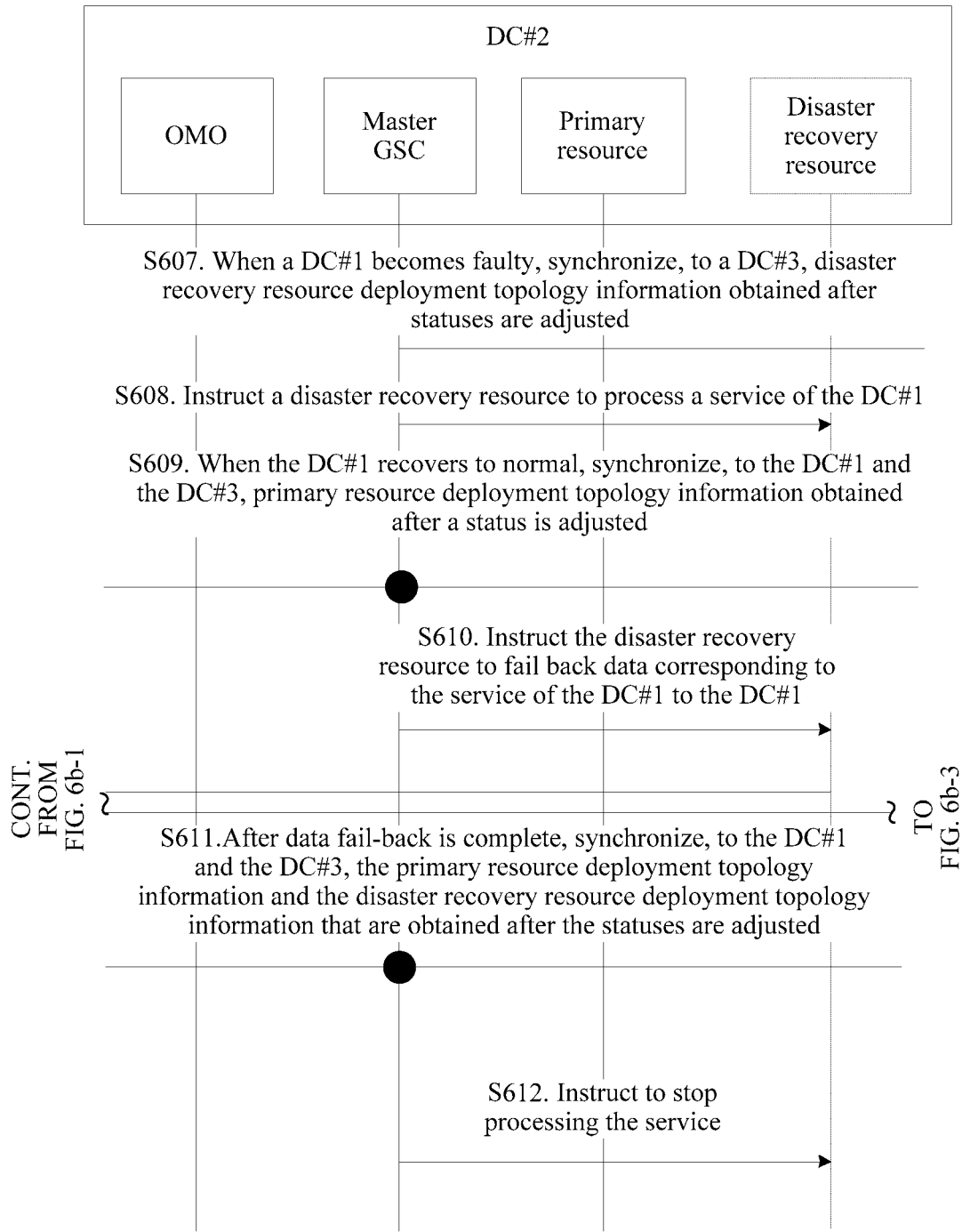
Figures 3, 6B:
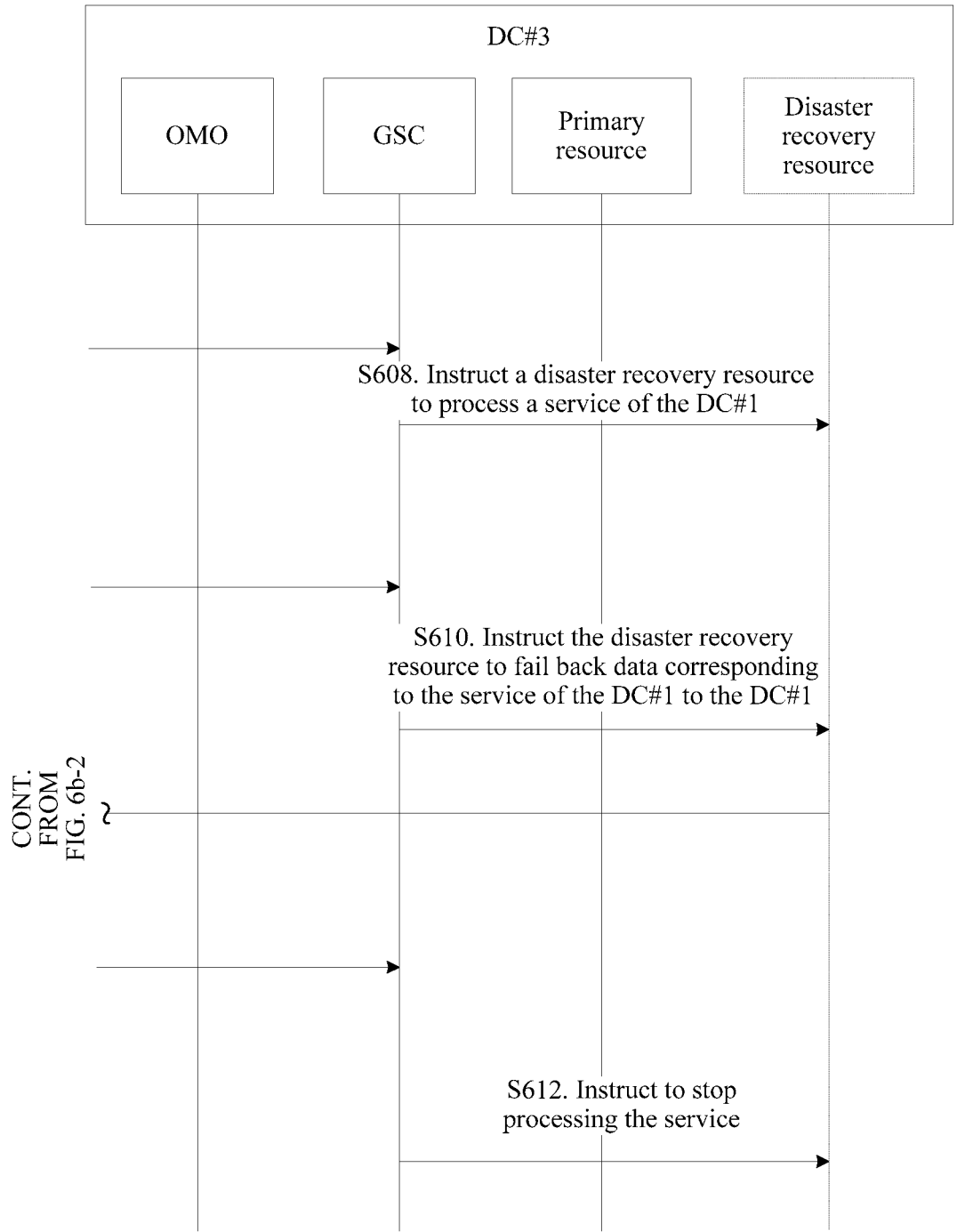

FIG. 6*b*-1 to FIG. 6*b*-3 are a flowchart of fail-over and service fail-back methods according to an embodiment of this application. The flowchart of the fail-over and service fail-back methods may include step 607 to step 611.

Step 607. When detecting that the DC#1 is faulty, the master GSC adjusts running statuses of disaster recovery resources corresponding to the DC#1 in the DC#2 and the DC#3 to "primary", and synchronizes, to the DC#3, disaster recovery resource deployment topology information obtained after the states are adjusted.

In this embodiment of this application, after topology discovery is complete, the master GSC may initiate channel state detection between the GSCs, and may also initiate channel state detection between OMOs, LBs, SPs, and DBs in the data centers. Each slave GSC collects channel detection information (equivalent to the foregoing communication status) obtained from the GSC, the OMO, the SP, and the DB in the data center corresponding to the slave GSC, and reports the channel detection information to the master GSC. The master GSC detects whether any data center is faulty based on channel detection information collected by the master GSC and the channel detection information reported by the slave GSCs.

In addition, in this embodiment of this application, the adjusted disaster recovery resource deployment topology information obtained after the statuses are adjusted is equivalent to the foregoing first status adjustment instruction. After detecting that the DC#1 is faulty, the master GSC may adjust the running statuses of the disaster recovery resources corresponding to the DC#1 in the DC#2 and the DC#3 to "primary" in the disaster recovery resource deployment topology information (for example, in the disaster recovery resource deployment topology information shown in FIG. 7A and FIG. 7B or FIG. 8A to FIG. 8D, adjust a last column of disaster recovery resources deployed for the DC#1 to "Configuration: backup/Running: primary"), and then the master GSC synchronizes adjusted disaster recovery resource deployment topology information to the DC#3.

Step 608. The GSCs in the DC#2 and the DC#3 instruct the disaster recovery resources locally set for the DC#1, to process a service of the DC#1.

After adjusting running statuses of disaster recovery resources of the DC#1, the master GSC in the DC#2 locally adjusts the running statuses of the disaster recovery resources locally set for the DC#1 to "primary", to activate the disaster recovery resources set for the DC#1 in the DC#2; and correspondingly, after receiving the adjusted disaster recovery resource deployment topology information, the GSC in the DC#3 adjusts the running statuses of the disaster recovery resources set for the DC#1 in the DC#3 to "primary", to activate the disaster recovery resources set for the DC#1 in the DC#3.

The DC#2 serves as a service interface backup point of the DC#1. After the DC#2 deploys an LB used for disaster recovery for the DC#1, the LB used for disaster recovery advertises, to an access network, a medium-priority route corresponding to a service address of the DC#1, and an LB in a primary resource of the DC#1 advertises a high-priority route corresponding to the service address of the DC#1. When the DC#1 works properly, the access network forwards a service request corresponding to the service of the DC#1 to the LB in the primary resource of the DC#1 based on the high-priority route corresponding to the service address of the DC#1. When detecting that the DC#1 is faulty, the access network disables the high-priority route, and forwards the service request corresponding to the service of the DC#1 to the LB in a disaster recovery resource of the DC#2 based on the medium-priority route corresponding to the service address of the DC#1, and the LB in the disaster recovery resource of the DC#2 distributes the service request to an SP in a disaster recovery resource of the DC#2 or the DC#3 for processing.

Step 609. When detecting that the DC#1 recovers to normal, the master GSC adjusts a running status of the primary resource of the DC#1 to "backup", and synchronizes, to the DC#1 and the DC#3, primary resource deployment topology information obtained after the status is adjusted.

In this embodiment of this application, the adjusted primary resource deployment topology information is equivalent to the foregoing data fail-back instruction. After detecting that the DC#1 recovers to normal, the master GSC may adjust the running status of the primary resource of the DC#1 to "backup" in the primary resource deployment topology information (for example, in the primary resource deployment topology information shown in FIG. 7A and FIG. 7B or FIG. 8A to FIG. 8D, adjust the status of the primary resource of the DC#1 to "Configuration: primary/ Running: backup"), and then the master GSC synchronizes the adjusted primary resource deployment topology information to the DC#1 and the DC#3.

Step 610. The GSCs in the DC#2 and the DC#3 instruct the disaster recovery resources locally deployed for the DC#1, to fail back data corresponding to the service of the DC#1 to the DC#1, and the GSC in the DC#1 instructs the primary resource of the DC#1 to receive the data.

After adjusting the running status of the primary resource of the DC#1, the master GSC in the DC#2 instructs the disaster recovery resources deployed for the DC#1 in the DC#2 (may be specifically the DB deployed for the DC#1), to send the data corresponding to the service of the DC#1 to the DC#1 (may be specifically the DB in the primary resource of the DC#1); and correspondingly, after receiving the adjusted primary resource deployment topology information, the GSC in the DC#3 instructs the disaster recovery resources deployed for the DC#1 in the DC#3, to send the data corresponding to the service of the DC#1 to the DC#1.

Step 611. After the disaster recovery resources set for the DC#1 in the DC#2 and the DC#3 fail back the data corresponding to the service of the DC#1, the master GSC adjusts the running status of the primary resource of the DC#1 to "primary", adjusts the running statuses of the disaster recovery resources corresponding to the DC#1 in the DC#2 and the DC#3 to "backup", and synchronizes, to the DC#1 and the DC#3, the primary resource deployment topology information and the disaster recovery resource deployment topology information that are obtained after the statuses are adjusted.

After sending the data of the DC#1, the disaster recovery resource deployed for the DC#1 in the DC#2 notifies the master GSC that data fail-back is complete (for example, returns a fail-back completion response to the master GSC). After sending the data of the DC#1, the disaster recovery resource deployed for the DC#1 in the DC#3 also notifies the master GSC that data fail-back is complete (for example, returns a fail-back completion response to the GSC in the DC#3, and the GSC in the DC#3 reports the response to the master GSC). After determining that the disaster recovery resources deployed for the DC#1 in the DC#2 and the DC#3 have failed back the data of the DC#1, the master GSC may adjust the running status of the primary resource of the DC#1 to "primary" in the primary resource deployment topology information (for example, in the primary resource deployment topology information shown in FIG. 7A and FIG. 7B or FIG. 8A to FIG. 8D, adjust the status of the primary resource of the DC#1 to "Configuration: primary/ Running: primary"), and adjust the running statuses of the disaster recovery resources corresponding to the DC#1 in the DC#2 and the DC#3 to "backup" in the disaster recovery resource deployment topology information (for example, in the disaster recovery resource deployment topology information shown in FIG. 7A and FIG. 7B or FIG. 8A to FIG. 8D, adjust a last column of disaster recovery resources deployed for the DC#1 to "Configuration: backup/Running: backup"). Then, the master GSC synchronizes the adjusted primary resource deployment topology information and disaster recovery resource deployment topology information to the DC#1 and the DC#3.

Step 612. The GSC in the DC#1 instructs the primary resource in the DC#1 to process the service of the DC#1, and the GSCs in the DC#2 and the DC#3 instruct backup resources in the DC#2 and the DC#3 to stop processing the service of the DC#1.

After receiving the primary resource deployment topology information and the disaster recovery resource deployment topology information, the GSC in the DC#1 instructs the primary resource in the DC#1 to process the service of the DC#1. After adjusting the resource statuses in the primary resource deployment topology information and the disaster recovery resource deployment topology information, the master GSC in the DC#2 instructs the disaster recovery resource deployed for the DC#1 in the DC#2 to stop processing the service of the DC#1. In addition, after adjusting the resource statuses in the primary resource deployment topology information and the disaster recovery resource deployment topology information, the GSC in the DC#3 instructs the disaster recovery resource deployed for the DC#1 in the DC#3 to stop processing the service of the DC#1.

When the running status of the primary resource of the DC#1 is "backup", an LB in the primary resource advertises, to the access network, a low-priority route corresponding to the service of the DC#1. In this case, the access network sends, according to the medium-priority route, a service request corresponding to the service of the DC#1 to an LB that performs backup on the DC#1 in the DC#2. The master GSC in the DC#2 adjusts the running status of the primary resource of the DC#1 to "primary", adjusts the running statuses of the disaster recovery resources corresponding to the DC#1 in the DC#2 and the DC#3 to "backup", and synchronizes, to the DC#1 and the DC#3, the primary resource deployment topology information and the disaster recovery resource deployment topology information that are obtained after the statuses are adjusted. Then, the LB in the primary resource of the DC#1 advertises, to the access network, a high-priority route corresponding to the service of the DC#1, and the access network sends the service request corresponding to the service of the DC#1 to the LB in the primary resource of the DC#1 according to the high-priority route. In addition, the GSCs in the DC#2 and the DC#3 instruct, based on the disaster recovery control information obtained after the statuses are adjusted, their respective backup resources to stop processing the service of the DC#1.

Optionally, in another possible implementation, when the DC#1 recovers to normal, the running status of the primary resource of the DC#1 is "backup" by default, and in this case, when detecting that the DC#1 has recovered to normal, the master GSC adjusts the running statuses of the disaster recovery resources corresponding to the DC#1 in the DC#2 and the DC#3 to "backup", and synchronizes, to the DC#3, the disaster recovery resource deployment topology information obtained after the statuses are adjusted. Then, the GSCs in the DC#2 and the DC#3 instruct the disaster recovery resources locally set for the DC#1, to fail back the data corresponding to the service of the DC#1 to the DC#1. After the disaster recovery resources set for the DC#1 in the DC#2 and the DC#3 fails back the data corresponding to the service of the DC#1, the GSC in the DC#1 instructs the primary resource of the DC#1 to process the service of the DC#1, and the GSCs in the DC#2 and the DC#3 instruct the backup resources in the DC#2 and the DC#3 to stop processing the service of the DC#1.

Optionally, if a resource corresponding to the service of the DC#1 needs to be configured, the EM sends a corresponding configuration parameter to the master OMO. If the master OMO finds, through query based on the disaster recovery control information, that the DC#2 and the DC#3 have deployed resources used for disaster recovery and backup of the DC#1, the master OMO sends the configuration parameter to the DC#1, so that the OMO in the DC#1 sends the configuration parameter to the primary resource of the DC#1, and also sends the configuration parameter to the OMOs in the DC#2 and the DC#3, so that the OMOs in the DC#2 and the DC#3 respectively send the configuration parameter to the disaster recovery resources deployed for the DC#1 in the DC#2 and the DC#3.

Optionally, in another possible implementation scenario, there may be no disaster recovery aggregation management entity separately set in each DC, but instead, the disaster recovery aggregation management entity is set in another network device different from the DCs. Functions of the disaster recovery aggregation management entity set in the another network device different from the DCs, except topology discovery and election of a master GSC/a master OMO, are similar to functions of the disaster recovery aggregation management entity set in the DCs.

Figure 9:
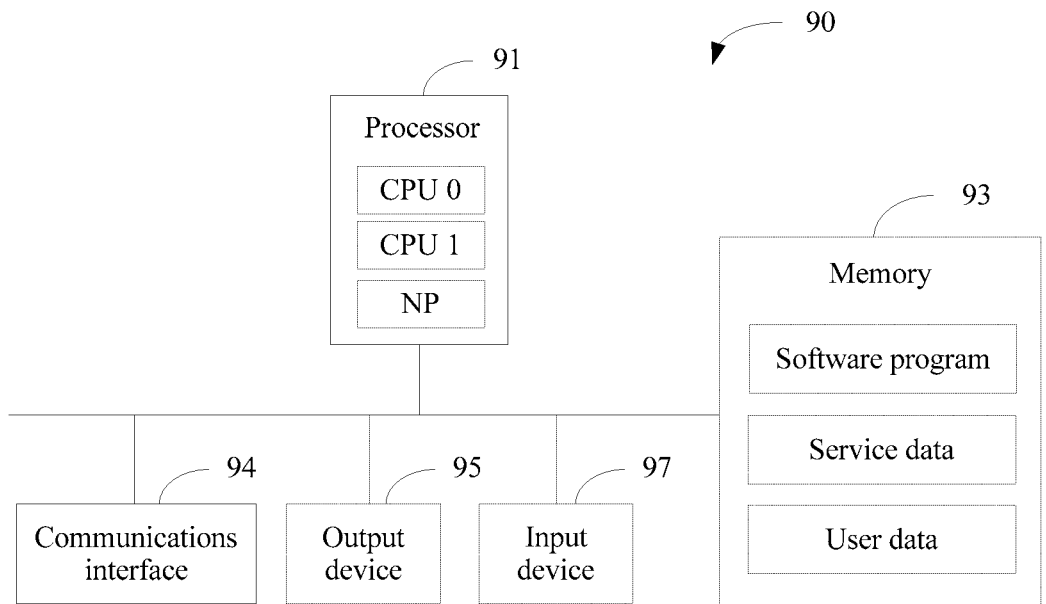
FIG. 9 is a schematic structural diagram of a network device according to an example embodiment of this application.

FIG. 9 is a schematic structural diagram of a network device according to an example embodiment of this application. A network device 90 may be the data center 210 shown in FIG. 1.

The network device 90 may include a processor 91 and a communications interface 94.

The processor 91 may include one or more processing units, and the processing unit may be a central processing unit (CPU), a network processor (NP), or the like.

The communications interface 94 is configured to connect to another data center or a management device.

Optionally, the network device 90 may further include a memory 93, and the processor 91 may be connected to the memory 93 and the communications interface 94 by using a bus. The memory 93 may be configured to store a software program, and the software program may be executed by the processor 91 to perform the method steps performed by the master data center or the backup data center in the embodiment shown in FIG. 3. In addition, the memory 93 may store various service data or user data.

Optionally, the network device 90 may further include an output device 95 and an input device 97. The output device 95 and the input device 97 are connected to the processor 91. The output device 95 may be a display configured to display information, a power amplifier device that plays sound, a printer, or the like, and the output device 95 may further include an output controller configured to provide an output to a screen, a power amplifier device, or a printer. The input device 97 may be a device configured by a user to enter information, such as a mouse, a keyboard, an electronic stylus, or a touch panel; and the input device 97 may further include an input controller configured to receive and process an input from a device such as a mouse, a keyboard, an electronic stylus, or a touch panel.

The following apparatus embodiment of this application may be used to perform the method embodiment of this application. For details not disclosed in the apparatus embodiment of this application, refer to the method embodiment of this application.

Figure 10:
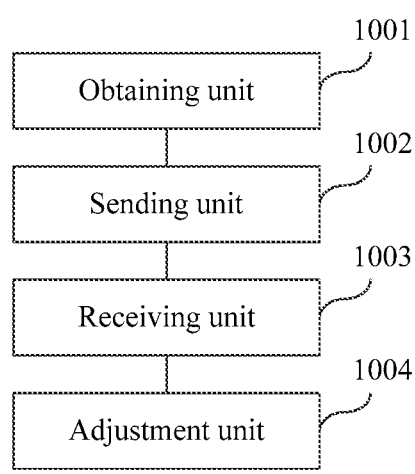
FIG. 10 is a structural block diagram of a disaster recovery deployment apparatus according to an embodiment of this application.

FIG. 10 is a structural block diagram of a disaster recovery deployment apparatus according to an embodiment of this application. The disaster recovery deployment apparatus may implement a part or all of a data center by using a hardware circuit or a combination of software and hardware. The data center may be the master data center in the embodiment shown in FIG. 3. The disaster recovery deployment apparatus may include: an obtaining unit 1001, a sending unit 1002, a receiving unit 1003, and an adjustment unit 1004.

The obtaining unit 1001 is configured to perform steps that are related to obtaining disaster recovery control information, status adjustment information, and other data or information and that are performed by the master data center in the embodiment shown in FIG. 3.

The sending unit 1002 is configured to perform steps that are related to data or information sending and that are performed by the master data center in the embodiment shown in FIG. 3.

The receiving unit 1003 is configured to perform steps that are related to data or information receiving and that are performed by the master data center in the embodiment shown in FIG. 3.

The adjustment unit 1004 is configured to perform steps that are related to adjusting a resource running status and that are performed by the master data center in the embodiment shown in FIG. 3.

The functions corresponding to the obtaining unit 1001 and the adjustment unit 1004 may be implemented by a GSC in the data center.

The functions corresponding to the sending unit 1002 and the receiving unit 1003 may be implemented by a GSC in the data center, or may be implemented by a primary resource of the data center as controlled or instructed by a GSC in the data center.

Figure 11:
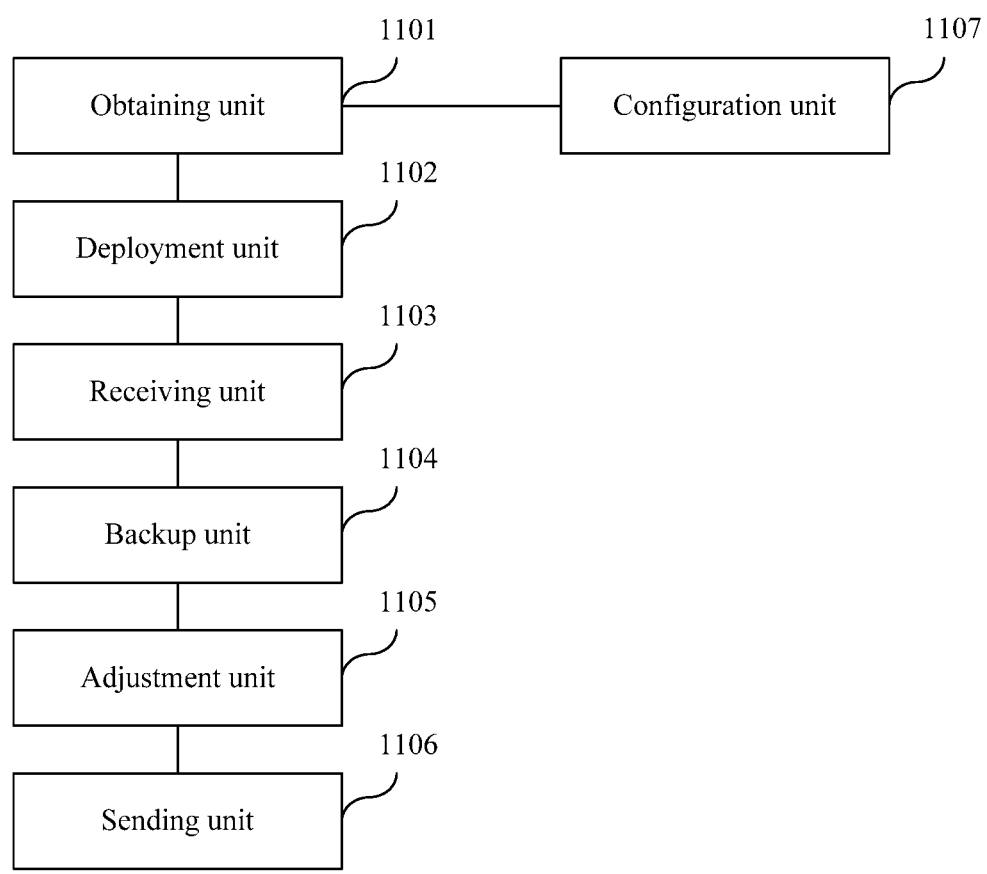
FIG. 11 is a structural block diagram of a disaster recovery deployment apparatus according to an embodiment of this application.

FIG. 11 is a structural block diagram of a disaster recovery deployment apparatus according to an embodiment of this application. The disaster recovery deployment apparatus may implement a part or all of a data center by using a hardware circuit or a combination of software and hardware. The data center may be the backup data center in the embodiment shown in FIG. 3. The disaster recovery deployment apparatus may include: an obtaining unit 1101, a deployment unit 1102, a receiving unit 1103, a backup unit 1104, an adjustment unit 1105, a sending unit 1106, and a configuration unit 1107.

The obtaining unit 1101 is configured to perform steps that are related to obtaining information such as disaster recovery control information, status adjustment instruction, a data fail-back instruction, and a configuration parameter and that are performed by the backup data center in the embodiment shown in FIG. 3.

The deployment unit 1102 is configured to perform steps that are related to deploying a disaster recovery resource and that are performed by the backup data center in the embodiment shown in FIG. 3.

The receiving unit 1103 is configured to perform steps that are related to data receiving and that are performed by the backup data center in the embodiment shown in FIG. 3.

The backup unit 1104 is configured to perform steps that are related to data backup and that are performed by the backup data center in the embodiment shown in FIG. 3.

The adjustment unit 1105 is configured to perform steps that are related to adjusting a status of a disaster recovery resource and that are performed by the backup data center in the embodiment shown in FIG. 3.

The sending unit 1106 is configured to perform steps that are related to data sending and that are performed by the backup data center in the embodiment shown in FIG. 3.

The configuration unit 1107 is configured to perform steps that are related to configuring a disaster recovery resource and that are performed by the backup data center in the embodiment shown in FIG. 3.

The functions corresponding to the obtaining unit 1101, the deployment unit 1102, and the adjustment unit 1105 may be implemented by a GSC in the data center.

The functions corresponding to the receiving unit 1103, the backup unit 1104, and the sending unit 1106 may be implemented by a GSC in the data center, or may be implemented by a backup resource of the data center as controlled or instructed by a GSC in the data center.

The function corresponding to the configuration unit 1107 may be implemented by an OMO in the data center.

It should be noted that disaster recovery deployment of the disaster recovery deployment apparatus according to the foregoing embodiments is described merely by using division into the foregoing function modules as an example. In actual application, the foregoing functions can be allocated to different function modules based on needs. To be specific, an inner structure of the device is divided into different function modules to implement all or some of the functions described above. In addition, the disaster recovery deployment apparatus provided in the foregoing embodiment and the method embodiment of the disaster recovery deployment method belong to a same concept. For a specific implementation process of the disaster recovery deployment apparatus, refer to the method embodiment, and details are not described herein again.

The sequence numbers of the foregoing embodiments of this application are merely for illustrative purposes, and are not intended to indicate priorities of the embodiments.

A person of ordinary skill in the art may understand that all or some of the steps performed by the processor in the foregoing embodiments may be performed by hardware, or may be performed by an instruction by controlling related hardware. The instruction may be stored in a computer-readable storage medium. The computer-readable storage medium may be a read-only memory, a magnetic disk, an optical disc, or the like.

The foregoing descriptions are merely specific implementations of this application, but are not intended to limit the protection scope of this application. Any solution obtained from any variation or replacement made on the claims by a person skilled in the art within the technical scope disclosed in this application shall fall within the protection scope of this application. Therefore, the protection scope of this application shall be subject to the protection scope of the claims.

What is claimed is:

1. A method for disaster recovery deployment, the method comprising:

receiving, by a master data center, a disaster recovery policy parameter from a management device;

generating, by the master data center, disaster recovery resource deployment topology information based on the disaster recovery policy parameter, wherein the disaster recovery resource deployment topology information indicates a disaster recovery resource to be deployed by at least one backup data center for a service of the master data center, wherein the disaster recovery resource is a resource used to perform disaster recovery and backup on the service of the master data center;

generating, by the master data center, data backup policy information based on the disaster recovery policy parameter, wherein the data backup policy information indicates a backup relationship of data corresponding to the service of the master data center in the at least one backup data center;

sending, by the master data center, the data corresponding to the service of the master data center to the at least one backup data center based on the disaster recovery resource deployment topology information and the data backup policy information;

obtaining, by the backup data center, the disaster recovery resource deployment topology information and the data backup policy information;

deploying, by the backup data center, a first disaster recovery resource for the master data center based on the disaster recovery resource deployment topology information and the data backup policy information; and receiving, by the backup data center, the data sent by the master data center, and backing up the received data;

wherein the generating, by the master data center, the disaster recovery resource deployment topology information based on the disaster recovery policy parameter comprises:

obtaining, by the master data center, specifications of the service of the master data center;

determining, by the master data center based on the specifications of the service of the master data center and a backup proportion of the data corresponding to the service of the master data center in each of the at least one backup data center, a quantity of disaster recovery resources to be deployed by the at least one backup data center for the service of the master data center; and generating, by the master data center, the disaster recovery resource deployment topology information that comprises the quantity of disaster recovery resources to be deployed by the at least one backup data center for the service of the master data center.

2. The method according to claim 1, wherein the deploying, by the backup data center, the first disaster recovery resource for the master data center comprises:
applying, by the backup data center based on the quantity of disaster recovery resources to be deployed for the service of the master data center, for a disaster recovery resource that is lacking in the backup data center, or releasing a disaster recovery resource that is redundant in the backup data center.

3. The method according to claim 1, wherein the generating, by the master data center, the data backup policy information based on the disaster recovery policy parameter comprises:
obtaining, by the master data center, identifiers of data sets of the service of the master data center;
generating, by the master data center, a correspondence between the disaster recovery resource in the at least one backup data center and identifiers of data sets that are to be backed up in the at least one backup data center and that are of the service of the master data center based on the identifiers of the data sets of the service of the master data center and a backup proportion of the service of the master data center in the at least one backup data center; and
generating, by the master data center, the data backup policy information that comprises the correspondence.

4. The method according to claim 3,
wherein the sending, by the master data center, the data corresponding to the service of the master data center to the at least one backup data center comprises:
sending, by the master data center, the data corresponding to the service of the master data center to a corresponding backup data center based on the correspondence; and
wherein the backing up, by the backup data center, the received data comprises:
storing, by the backup data center, the data sent by the master data center in the corresponding disaster recovery resource based on the correspondence.

5. The method according to claim 1, further comprising:
in response to the master data center becoming faulty, obtaining, by the backup data center, a first status adjustment instruction; and
adjusting, by the backup data center, a status of the first disaster recovery resource deployed by the backup data center to a running state based on the first status adjustment instruction, so that the first disaster recovery resource deployed by the backup data center processes the corresponding service of the master data center based on the backed-up data.

6. The method according to claim 5, further comprising:
in response to the master data center recovering to normal, obtaining, by the backup data center, a data fail-back instruction, and sending the data that corresponds to the service of the master data center and that is stored in the backup data center to the master data center based on the data fail-back instruction;
receiving, by the master data center, the data sent by the at least one backup data center; and
obtaining, by the master data center, a second status adjustment instruction, and adjusting a status of a primary resource in the master data center to a running state based on the second status adjustment instruction, so that the primary resource processes the corresponding service of the master data center based on the data sent by the at least one backup data center, wherein the primary resource is a resource used to process a service of the master data center.

7. The method according to claim 1, further comprising:
obtaining, by the backup data center, a configuration parameter, wherein the configuration parameter is a parameter sent by a configuration coordination center based on a query result obtained after the configuration coordination center obtains the disaster recovery control information and the configuration parameter and queries, based on the disaster recovery control information, a data center that backs up the service of the master data center, and the configuration coordination center is any data center different from the backup data center, or the configuration parameter is a parameter sent by the management device to the backup data center, and the configuration parameter configures resources corresponding to the service of the master data center; and
configuring, by the backup data center based on the configuration parameter, the first disaster recovery resource to be deployed in the backup data center.

8. An apparatus for disaster recovery deployment, wherein the apparatus is included in a master data center, the apparatus comprising:
one or more processors; and
non-transitory computer-readable memory storing a program to be executed by the one or more processors to cause the apparatus to:
receive a disaster recovery policy parameter from a management device, wherein the disaster recovery policy parameter instructs the master data center to back up a service of the master data center to at least one backup data center;
generate disaster recovery resource deployment topology information based on the disaster recovery policy parameter, wherein the disaster recovery resource deployment topology information indicates a disaster recovery resource to be deployed by the at least one backup data center for the service of the master data center;
generate data backup policy information based on the disaster recovery policy parameter, wherein the data backup policy information indicates a backup relationship of data corresponding to the service of the master data center in the at least one backup data center;
send the data corresponding to the service of the master data center to the at least one backup data center based on the disaster recovery resource deployment topology information and the data backup policy information, so that the backup data center receives the data sent by the master data center and backs up the received data;
wherein generating the disaster recovery resource deployment topology information based on the disaster recovery policy parameter comprises:
obtaining specifications of the service of the master data center;
determining, based on the specifications of the service of the master data center and a backup proportion of the data corresponding to the service of the master data center in the at least one backup data center, a quantity of disaster recovery resources to be deployed by the at least one backup data center for the service of the master data center; and generating the disaster recovery resource deployment topology information that comprises the quantity of disaster recovery resources to be deployed by the at least one backup data center for the service of the master data center.

9. The apparatus according to claim 8, wherein generating the data backup policy information based on the disaster recovery policy parameter comprises:
    obtaining identifiers of data sets of the service of the master data center;
    generating a correspondence between the disaster recovery resource in the at least one backup data center and identifiers of data sets that are to be backed up in the at least one backup data center and that are of the service of the master data center based on the identifiers of the data sets of the service of the master data center and a backup proportion of the service of the master data center in the at least one backup data center; and
    generating the data backup policy information that comprises the correspondence.

10. The apparatus according to claim 9, wherein executing the program by the one or more processors further causes the apparatus to:
    send the data corresponding to the service of the master data center to a corresponding backup data center based on the correspondence.

11. The apparatus according to claim 8, wherein executing the program by the one or more processors further causes the apparatus to:
    in response to the master data center recovering from a failure to normal, receive the data that is sent by the at least one backup data center and that is of the data corresponding to the service of the master data center;
    obtain a second status adjustment instruction; and
    adjust a status of a primary resource in the master data center to a running state based on the second status adjustment instruction, so that the primary resource processes the corresponding service of the master data center based on the data sent by the at least one backup data center, wherein the primary resource is a resource used to process a service of the master data center.

12. A disaster recovery deployment system, comprising:
    a master data center; and
    at least one backup data center,
    wherein the master data center is configured to:
        receive a disaster recovery policy parameter from a management device, wherein the disaster recovery policy parameter instructs the master data center to back up a service of the master data center to the at least one backup data center;
        generate disaster recovery resource deployment topology information based on the disaster recovery policy parameter, wherein the disaster recovery resource deployment topology information indicates a disaster recovery resource to be deployed by the at least one backup data center for the service of the master data center;
        generate data backup policy information based on the disaster recovery policy parameter, wherein the data backup policy information indicates a backup relationship of data corresponding to the service of the master data center in the at least one backup data center; and
        send data corresponding to the service of the master data center to the at least one backup data center based on the disaster recovery resource deployment topology information and the data backup policy information; and
    wherein the backup data center is configured to:
        obtain the disaster recovery resource deployment topology information and the data backup policy information; and
        deploy a first disaster recovery resource for the master data center based on the disaster recovery resource deployment topology information and the data backup policy information, receive the data sent by the master data center, and back up the received data,
    wherein the master data center generating the disaster recovery resource deployment topology information based on the disaster recovery policy parameter comprises:
        obtaining specifications of the service of the master data center;
        determining, based on the specifications of the service of the master data center and a backup proportion of the data corresponding to the service of the master data center in the at least one backup data center, a quantity of disaster recovery resources to be deployed by the at least one backup data center for the service of the master data center; and
        generating the disaster recovery resource deployment topology information that comprises the quantity of disaster recovery resources to be deployed by the at least one backup data center for the service of the master data center.

13. The system according to claim 12, wherein the backup data center is further configured to:
    in response to the master data center becoming faulty, obtain a first status adjustment instruction; and
    adjust a status of the first disaster recovery resource deployed by the backup data center to a running state based on the first status adjustment instruction, so that the first disaster recovery resource deployed by the backup data center processes the corresponding service of the master data center based on the backed-up data.

14. The system according to claim 13,
    wherein the backup data center is further configured to: in response to the master data center recovering to normal, obtain a data fail-back instruction, and send the data that corresponds to the service of the master data center and that is stored in the backup data center to the master data center based on the data fail-back instruction; and
    wherein the master data center is further configured to:
        receive the data sent by the at least one backup data center, obtain a second status adjustment instruction, and adjust a status of a primary resource in the master data center to a running state based on the second status adjustment instruction, so that the primary resource processes the corresponding service of the master data center based on the data sent by the at least one backup data center, wherein the primary resource is a resource used to process a service of the master data center.

* * * * *